(12) United States Patent
Kitanaka

(10) Patent No.: US 8,258,735 B2
(45) Date of Patent: Sep. 4, 2012

(54) POWER CONVERTING APPARATUS FOR MOTOR DRIVING

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/119,893

(22) PCT Filed: Dec. 15, 2008

(86) PCT No.: PCT/JP2008/072789
§ 371 (c)(1),
(2), (4) Date: Mar. 18, 2011

(87) PCT Pub. No.: WO2010/070723
PCT Pub. Date: Jun. 24, 2010

(65) Prior Publication Data
US 2011/0175558 A1  Jul. 21, 2011

(51) Int. Cl.
H02P 27/06  (2006.01)
(52) U.S. Cl. ............. 318/400.3; 318/400.02; 318/400.9; 318/716; 318/801
(58) Field of Classification Search ............. 318/400.02, 318/400.3, 400.9, 716, 801, 805
See application file for complete search history.

(56) References Cited

U.S. PATENT DOCUMENTS

| 6,307,759 | B1 | 10/2001 | Inarida et al. | |
|---|---|---|---|---|
| 6,407,531 | B1* | 6/2002 | Walters et al. | 318/805 |
| 6,437,997 | B1 | 8/2002 | Inarida et al. | |
| 7,049,779 | B2* | 5/2006 | Chen et al. | 318/400.09 |
| 7,808,202 | B2* | 10/2010 | Tobari et al. | 318/801 |
| 2006/0049792 | A1* | 3/2006 | Chen et al. | 318/716 |
| 2008/0048607 | A1 | 2/2008 | Kono | |
| 2008/0157710 | A1* | 7/2008 | Tobari et al. | 318/801 |
| 2010/0066283 | A1* | 3/2010 | Kitanaka | 318/400.02 |
| 2010/0237821 | A1 | 9/2010 | Kitanaka | |

FOREIGN PATENT DOCUMENTS

| EP | 1 553 693 | 12/2007 |
|---|---|---|
| JP | 56-049693 A | 5/1981 |
| JP | 1-227693 A | 9/1989 |
| JP | 4-368475 A | 12/1992 |
| JP | 10-323055 | 12/1998 |

(Continued)

OTHER PUBLICATIONS

International Search Report (PCT/ISA/210) for PCT/JP2008/072789 dated Mar. 17, 2009.

(Continued)

Primary Examiner — Paul Ip
(74) Attorney, Agent, or Firm — Buchanan Ingersoll & Rooney PC

(57) ABSTRACT

A second control unit includes a current-command generating unit that generates, based on a torque command T*, a current command of the motor, a voltage-amplitude-index calculating unit that calculates, based on the current command, a voltage amplitude index (a modulation ratio PMF), a current-command adjusting unit that generates, based on the modulation ratio PMF and a frequency FINV of the motor, a current command adjustment amount dV, and a voltage command/PWM signal generating unit including a pulsation-suppression-signal generating unit that generates, based on a DC voltage EFC, a pulsation suppression signal for suppressing a pulsation component of a power supply 2f component to generate a gate signal (a PWM signal) to an inverter.

20 Claims, 11 Drawing Sheets

FOREIGN PATENT DOCUMENTS

| | | |
|---|---|---|
| JP | 2001-238490 A | 8/2001 |
| JP | 2006-094646 | 4/2006 |
| JP | 2007-259698 A | 10/2007 |
| JP | 4082444 B1 | 4/2008 |
| RU | 2 193 814 | 11/2002 |
| RU | 2 314 450 | 1/2008 |
| WO | WO 2008/026249 A1 | 3/2008 |

OTHER PUBLICATIONS

Written Opinion (PCT/ISA/237) for PCT/JP2008/072789 dated Mar. 17, 2009.

Notice of Allowance (Decision on Grant a patent for Invention) dated Apr. 17, 2012, issued in corresponding Russian Application No. 201123402/07(034640), with English translation thereof.

* cited by examiner

POWER CONVERTING APPARATUS FOR MOTOR DRIVING

TECHNICAL FIELD

The present invention relates to a power converting apparatus for motor driving suitable for control of an AC motor.

BACKGROUND ART

In recent years, an AC motor is applied for power in the fields of industrial machines and home appliances and transportation fields of an automobile, an electric motor vehicle, and the like. To drive the AC motor, a DC power supply or an AC power supply is necessary. In general, a power converting apparatus for motor driving for which the DC power supply is used as an input power supply has a configuration in which the power converting apparatus receives input of a DC voltage supplied from the DC power supply, generates an AC voltage having an arbitrary frequency with an inverter circuit, and drives the AC motor. In general, a power converting apparatus for which the AC power supply is used as an input power supply has a configuration in which the power converting apparatus includes a converter circuit on an input side, once converts an AC voltage received by the converter circuit into a DC voltage, and supplies this DC voltage to the inverter circuit to drive the AC motor.

The configuration and the like of the power converting apparatus for motor driving are explained with reference to a power converting apparatus for motor driving used for an AC electric railway as an example. A stringing voltage as an AC power supply is a single-phase AC voltage of 20 kilovolts to 25 kilovolts. This single-phase AC voltage is stepped down to about 1 kilovolt to 2 kilovolts by a transformer and then input to the converter circuit of the power converting apparatus for motor driving. The converter circuit receives the input of the single-phase AC voltage of 1 kilovolt to 2 kilovolts, converts the single-phase AC voltage into a DC voltage of about 1500 volts to 3000 volts, and outputs the DC voltage to the inverter circuit.

It is known that the DC voltage as the output of the converter circuit includes pulsation of a frequency component twice as large as an AC power supply frequency (hereinafter referred to as "power supply 2f component"). When the frequency of the AC motor is near this power supply 2f component, it is likely that the electric current of the AC motor changes to an over current or large pulsation occurs in the torque of the AC motor to hinder a safe operation.

Patent Document 1 discloses that such a power supply 2f component included in the DC voltage is extracted and the width of a PWM pulse of the inverter circuit is adjusted to cancel the influence of the power supply 2f component.
Patent Document 1: Japanese Patent Application Laid-open No. S56-49693

DISCLOSURE OF INVENTION

Problem to be Solved by the Invention

However, control for cancelling the power supply 2f component disclosed in Patent Document 1 cannot be applied to all application examples. For example, to maximize an applied voltage to the AC motor, it is difficult to apply the control to an electric motor vehicle or the like that selects and uses a so-called one-pulse mode as a switching state of the inverter circuit.

The one-pulse mode is a mode for using a switching state in which the number of pulses included in an output line voltage half period of an inverter is one. However, in a work area in this one-pulse mode, it is impossible to adjust pulse width. If the technology of Patent Document 1 is applied to an electric motor vehicle or the like that selects and uses the one-pulse mode, a problem occurs in that the AC motor generates an over current or excessively large torque pulsation occurs. Therefore, it is difficult to apply the technology of Patent Document 1, the main point of which is to adjust PWM pulse width for the inverter circuit, to the electric motor vehicle or the like that selects and uses the one-pulse mode.

The present invention has been devised in view of the above and it is an object of the present invention to provide a power converting apparatus for motor driving that enables cancellation control for the power supply 2f component while suppressing generation of an over current or excessively large torque pulsation in the AC motor in an application example in which the one-pulse mode is selected and used as a switching state of the inverter circuit.

Means for Solving Problem

In order to solve the aforementioned problems and attain the aforementioned object, a power converting apparatus for motor driving according to one aspect of the present invention is constructed in such a manner as to include: a first power converting unit that is connected to an AC power supply and converts an AC voltage from the AC power supply into a DC voltage; a second power converting unit that is connected to the first power converting unit and converts the DC voltage into the AC voltage and outputs the AC voltage to an AC motor; a first control unit that controls the first power converting unit; and a second control unit that controls the second power converting unit, wherein the second control unit includes: a current-command generating unit that generates, based on at least a torque command, a current command for the AC motor; a voltage-amplitude-index calculating unit that calculates, based on the current command, a voltage amplitude index that should be applied to the AC motor; a current-command adjusting unit that generates, based on at least the voltage amplitude index and a frequency of the AC motor, a current command adjustment amount for adjusting the current command; and a pulsation-suppression-signal generating unit that generates, based on the DC voltage, a pulsation suppression signal, and the second control unit generates, based on a control signal including the current command adjusted by the current command adjustment amount and the pulsation suppression signal, a PWM signal to the second power converting unit and outputs the PWM signal.

Further, a power converting apparatus for motor driving according to another aspect of the present invention is constructed in such a manner as to include: a first power converting unit that is connected to an AC power supply and converts an AC voltage from the AC power supply into a DC voltage; a second power converting unit that is connected to the first power converting unit and converts the DC voltage into the AC voltage and outputs the AC voltage to an AC motor; a first control unit that controls the first power converting unit; and a second control unit that controls the second power converting unit, wherein the second control unit includes: a current-command generating unit that generates, based on at least a torque command, a current command for the AC motor; and a voltage-amplitude-index calculating unit that calculates, based on the current command, a voltage amplitude index that should be applied to the AC motor, and the first control unit includes: a DC-voltage-command generating unit that generates a DC voltage command, which is a target value of the DC voltage; and a DC-voltage control unit that performs control for causing the DC voltage and the DC voltage command to coincide with each other, and when the frequency of the AC motor is present in a predetermined range and an output voltage of the second power converting unit is set as a predetermined value smaller than a maximum voltage that can be output according to the DC voltage, the DC-voltage-command generating unit generates and outputs a DC voltage command for causing the output voltage of the second power converting unit to coincide with the predetermined value.

Effect of the Invention

With the power converting apparatus for motor driving according to the present invention, the PWM signal to the second power converting unit is generated according to the control signal including the current command adjusted by the current instruction adjustment amount for adjusting the current command and the pulsation signal for controlling a pulsation component of the power supply 2f component. Therefore, there is an effect that it is possible to perform cancellation control for the power supply 2f component while suppressing generation of an over current or excessively large torque pulsation in the AC motor in an application example in which the one-pulse mode is selected and used as a switching state of the inverter circuit.

EXPLANATIONS OF LETTERS OR NUMERALS

Figure 1:
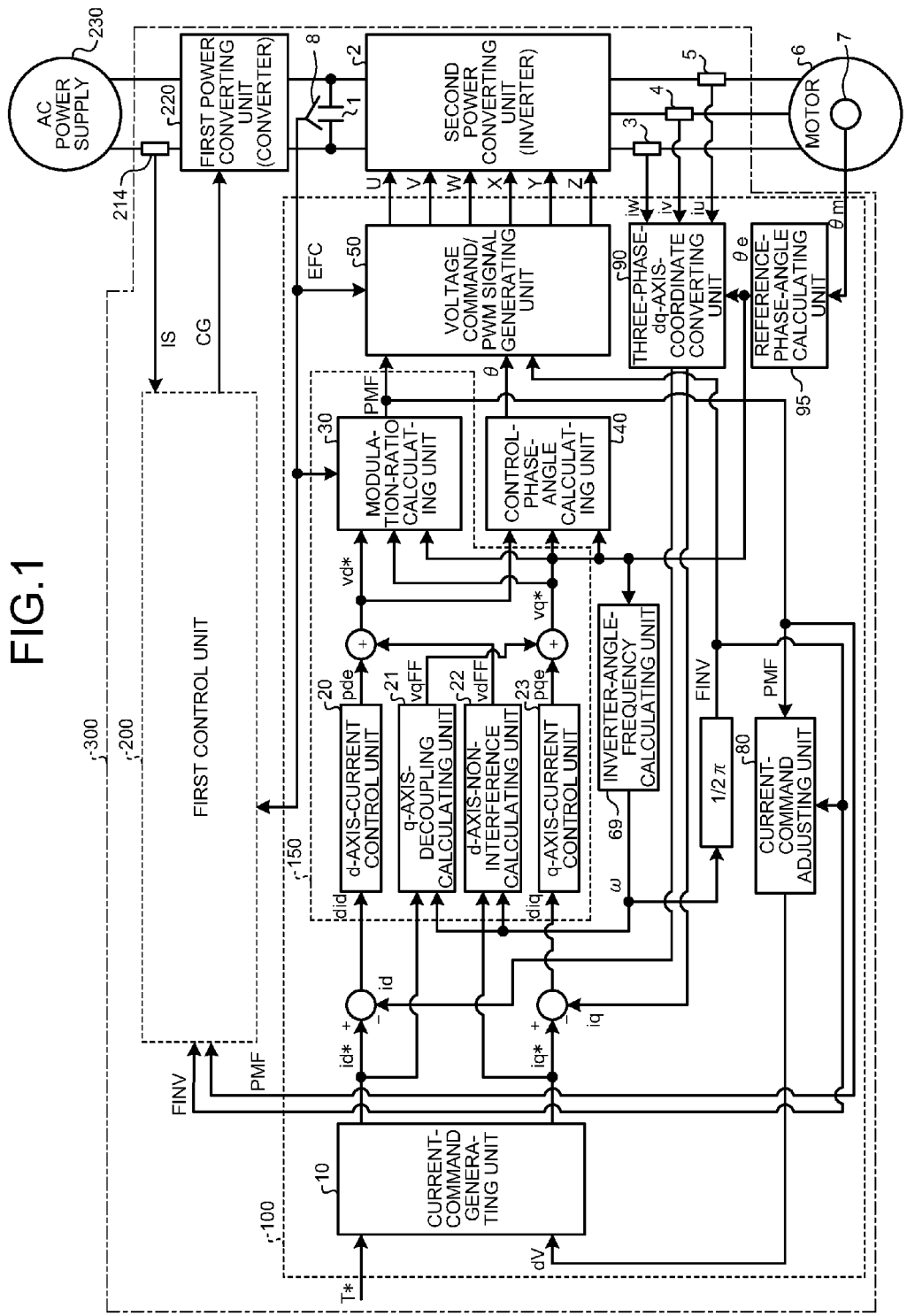
FIG. 1 is a diagram of a configuration example of a power converting apparatus for motor driving in a first embodiment of the present invention.

1 Capacitor
2 Second power converting unit (inverter)
3, 4, 5 Current detector
6 Motor
7 Rotation detector
8 Voltage detector
10 Current-command generating unit
11 d-axis-basic-current-command generating unit
14 Adder
15 q-axis-current-command generating unit
20 d-axis-current control unit
21 q-axis-decoupling calculating unit
22 d-axis-non-interference calculating unit
23 q-axis-current control unit
30 Modulation-ratio calculating unit
40 Control-phase-angle calculating unit
50 Voltage command/PWM signal generating unit
55 Voltage-command calculating unit
57 Asynchronous-multi-pulse-carrier-signal generating unit
58 Synchronous-three-pulse-carrier generating unit
59 Selection switch
60 Pulse-mode-switching processing unit
61 to 63 Comparator
64 to 66 Inverting circuit
69 Inverter-angular-frequency calculating unit
70 Multiplier
71 Pulsation-suppression-signal calculating unit
72 Band pass filter (BPF)
73 Adder
74 Divider
80 Current-command adjusting unit
81 Limiter
82 Amplifier
84 Subtracter
85 Modulation-ratio-command generating unit
90 Three-phase-dq-axis-coordinate converting unit
95 Reference-phase-angle calculating unit
100 Second control unit
150 Voltage-amplitude-index calculating unit
200 First control unit
210 DC-voltage-command generating unit
211 Voltage control unit
212 Current control unit
213 PWM-signal generating unit
214 Current detector
220 First power converting unit (converter)
230 AC power supply
240 DC voltage command table
250 Modulation ratio command table
251 Subtracter
252 Limiter
253 Proportional integrator
254 Adder
280 DC-voltage control unit
300 Power converting apparatus for motor driving

BEST MODE(S) FOR CARRYING OUT THE INVENTION

Embodiments of a power converting apparatus for motor driving according to the present invention are explained in detail below with reference to the accompanying drawings. The present invention is not limited by the embodiments explained below.

First Embodiment

FIG. 1 is a diagram of a configuration example of a power converting apparatus for motor driving in a first embodiment of the present invention. In FIG. 1, an example of a configuration of the power converting apparatus for motor driving that controls a permanent magnet synchronous motor as an AC motor is shown.

In FIG. 1, a power converting apparatus for motor driving 300 in the first embodiment includes a converter 220 functioning as a first power converting unit that receives a single-phase AC voltage from an AC power supply 230 and converts the single-phase AC voltage into a DC voltage, a capacitor 1 functioning as a DC power supply, an inverter 2 functioning as a second power converting unit that converts the DC voltage from the capacitor 1 into an AC voltage having an arbitrary frequency, and an AC motor (hereinafter simply referred to as "motor") 6. As the converter 220, a single-phase two-level PWM converter, a single-phase three-level PWM converter, or the like is suitable. As the inverter 2, a voltage type inverter such as a three-phase two-level PWM inverter or a three-phase three-level PWM inverter is suitable. Because main circuit configurations of both of the converter 220 and the inverter 2 are publicly known, detailed explanation of the converter 220 and the inverter 2 is omitted.

The AC power supply 230 is a power supply that outputs, for example, a single-phase AC voltage of 1 kilovolt to 2 kilovolts. The converter 220 is a voltage converter unit that receives the single-phase AC voltage as an input, converts the single-phase AC voltage into, for example, a DC voltage of about 1500 volts to 3000 volts, and outputs the DC voltage to the capacitor 1. The DC voltage (the voltage of the capacitor 1) as the output of the converter 220 includes about 5% of pulsation of a frequency component twice as large as a power supply frequency of the AC power supply 230 (hereinafter referred to as "power supply 2f component").

The converter 220 as the first power converting unit receives the single-phase AC voltage from the AC power supply 230, converts the single-phase AC voltage into a DC voltage, and outputs the DC voltage to the capacitor 1. As the converter 220, a so-called PWM converter that performs AC-DC conversion using a switching element (not shown) such as an IGBT is suitable. Because a main circuit configuration of the converter 220 is publicly known, detailed explanation of the converter 220 is omitted.

A current detector 214 that detects an input current from the AC power supply 230 is arranged in the power converting apparatus for motor driving 300. An input current IS detected by the current detector 214 is input to a first control unit 200. A control signal CG for controlling the switching element of the converter 220 is generated by the first control unit 200 and output to the converter 220.

A voltage detector 8 that detects a voltage (hereinafter referred to as "capacitor voltage") EFC of the capacitor 1 is arranged in the power converting apparatus for motor driving 300. On an output line connecting the inverter 2 and the motor 6, current detectors 3, 4 and, 5 that detect electric currents iu, iv, and iw flowing to the output line are arranged. A rotation detector 7 that detects a signal (a rotor mechanical angle θm) representing a rotation state of a rotor is arranged in the motor 6. These detection signals of the current detectors 3, 4, and 5 and the rotation detector 7 are input to a second control unit 100.

A rotation sensor-less system that calculates a position signal from a detected or estimated voltage value, current value, or the like of the motor 6 instead of a signal (a position signal) obtained from the rotation detector 7 can be used. In this case, the rotation detector 7 is unnecessary. In other words, the acquisition of the signal of the rotation state is not limited to the use of the rotation detector 7.

The current detectors 3, 4, and 5 only have to be set in at least two phases. In this case, a current in the remaining one phase can be obtained by calculation based on outputs of the set current detectors in the two phases. An output current of the inverter 2 can be reproduced and acquired using a DC side current of the inverter 2.

Gate signals U, V, W, X, Y, and Z generated by the second control unit 100 are input to the inverter 2. The switching element incorporated in the inverter 2 is subjected to PWM control. As the inverter 2, a voltage type PWM inverter is suitable. Because the configuration of the inverter 2 is publicly known, detailed explanation of the inverter 2 is omitted.

The configuration of the second control unit 100 is explained below. As shown in FIG. 1, a torque command T* is input to the second control unit 100 from a not-shown external control apparatus. This second control unit 100 is a component having a function of controlling an inverter 2 such that a generated torque T of the motor 6 coincides with the input torque command T*. The second control unit 100 includes a current-command generating unit 10, a voltage-amplitude-index calculating unit 150, a control-phase-angle calculating unit 40, a voltage command/PWM signal generating unit 50, a current-command adjusting unit 80, an inverter-angular-frequency calculating unit 69, a reference-phase-angle calculating unit 95, and a three-phase-dq-axis-coordinate converting unit 90. The voltage-amplitude-index calculating unit 150 includes a d-axis-current control unit 20, a q-axis-decoupling calculating unit 21, a d-axis-non-interference calculating unit 22, a q-axis-current control unit 23, and a modulation-ratio calculating unit 30.

The reference-phase-angle calculating unit 95 calculates a reference phase angle θe from a rotor mechanical angle θm. The three-phase-dq-axis-coordinate converting unit 90 generates a d-axis current id and a q-axis current iq from the three-phase current iu, iv, and iw detected by the current detectors 3, 4, and 5 and the reference phase angle θe. The inverter-angular-frequency calculating unit 69 calculates an inverter output angular frequency ω from the reference phase angle θe. The current-command generating unit 10 generates a d-axis current command id* and a q-axis current command iq* from a torque command T* input from the outside and a current command adjustment value dV.

The d-axis-current control unit 20 subjects a current deviation id between the d-axis current command id* and the d-axis current id to proportional integral control and generates a d-axis current error pde. The q-axis-decoupling calculating unit 21 calculates a q-axis feed forward voltage vqFF from the d-axis current command id* and the inverter output angular frequency ω. The d-axis-non-interference calculating unit 22 calculates a d-axis feed forward voltage vdFF from the q-axis current command iq* and the inverter output angular frequency ω. The q-axis-current control unit 23 subjects a current deviation diq between the q-axis current command ip* and the q-axis current iq to proportional integration control and generates a q-axis current error pqe. The modulation-ratio calculating unit 30 calculates a modulation ratio PMF from a d-axis voltage command vd*, which is a sum of the d-axis current error dpe and the d-axis feed forward voltage vdFF, a q-axis voltage command vq*, which is a sum of the q-axis current error pqe and the q-axis feed forward voltage vqFF, the reference phase angle θe, and the capacitor voltage EFC.

The control-phase-angle calculating unit 40 calculates a control phase angle θ from the d-axis voltage command vd*, the q-axis voltage command vq*, and the reference phase angle θe. The current-command adjusting unit 80 generates a current command adjustment value dV from the modulation ratio PMF and the inverter output frequency FINV. The voltage command/PWM signal generating unit 50 generates, from the modulation ratio PMF, the control phase angle θ, and the inverter output frequency FINV, gate signals U, V, W, X, Y, and Z to the inverter 2.

According to the functions of the components configured as explained above, the voltage-amplitude-index calculating unit 150 generates the modulation ratio PMF, the d-axis voltage command vd*, and the q-axis voltage command vq* using the current deviation did, the q-axis feed forward voltage vqFF, the d-axis feed forward voltage vdFF, the current deviation diq, the capacitor voltage EFC, and the reference phase angle θe, outputs the modulation ratio PMF to the voltage command/PWM signal generating unit 50, and outputs the d-axis voltage command vd*a and the q-axis voltage command vq* to the control-phase-angle calculating unit 40.

According to the functions of the components configured as explained above, the second control unit 100 generates the gate signals U, V, W, X, Y, and Z using the rotor mechanical angle θm, the three-phase currents iu, iv, and iw, the torque command T*, and the capacitor voltage EFC and outputs the gate signals U, V, W, X, Y, and Z to the inverter 2.

Detailed configurations and operations of the control blocks explained above are explained below. First, the reference-phase-angle calculating unit 95 calculates, based on the following formula, the reference phase angle θe as an electric angle from the rotor mechanical angle θm.

$$\theta e = \theta m \cdot PP \quad (1)$$

where, PP represents the number of pole pairs of the motor 6.

The three-phase-dq-axis-coordinate converting unit 90 generates, based on the following formula, the d-axis current id and the q-axis current iq from the three phase currents iu, iv, and iw and the reference phase angle θe.

$$\begin{pmatrix} iq \\ id \end{pmatrix} = \sqrt{\frac{2}{3}} \begin{pmatrix} \cos\theta e & \cos\left(\theta e - \frac{2}{3}\pi\right) & \cos\left(\theta e + \frac{2}{3}\pi\right) \\ \sin\theta e & \sin\left(\theta e - \frac{2}{3}\pi\right) & \sin\left(\theta e + \frac{2}{3}\pi\right) \end{pmatrix} \cdot \begin{pmatrix} iu \\ iv \\ iw \end{pmatrix} \quad (2)$$

The inverter-angular-frequency calculating unit 69 calculates, based on the following formula, the inverter output angular frequency ω by differentiating the reference phase angle θe.

$$\omega = d\theta e/dt \quad (3)$$

When the inverter output angular frequency ω is calculated, the inverter output frequency FINV obtained by dividing the inverter output angular frequency ω by 2π is also calculated.

Figure 2:
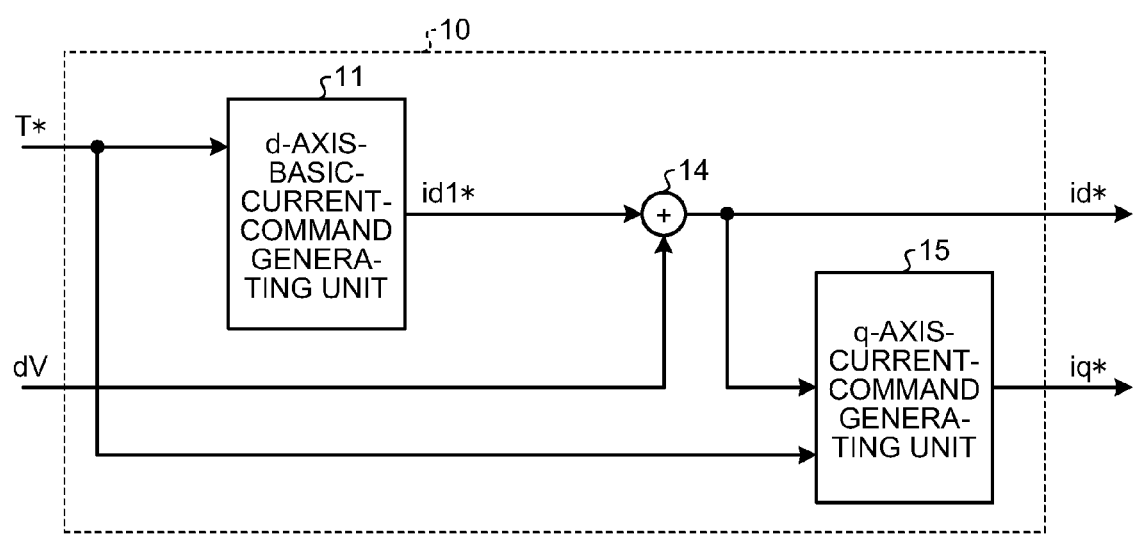
FIG. 2 is a diagram of a detailed configuration example of a current-command generating unit shown in FIG. 1.

A detailed configuration and operation of the current-command generating unit 10 are explained below with reference to FIG. 2. FIG. 2 is a diagram of a detailed configuration example of the current-command generating unit 10 shown in FIG. 1.

The current-command generating unit 10 is a component having a function of generating, based on the torque command T* input from the outside, the d-axis current command id* and the q-axis current command iq*. The current-command generating unit 10 includes a d-axis-basic-current-command generating unit 11, a q-axis-current-command generating unit 15, and an adder 14. Examples of a method of generating the d-axis current command id* and the q-axis current command iq* include a maximum torque/current control method for generating maximum torque with a certain electric current and a maximum efficiency control method for maintaining efficiency of a motor at the maximum. These optimum control methods are methods of performing control using the rotation speed of the motor, the magnitude of output torque and the like as parameters such that an actual current of the motor 6 coincides with a predetermined calculation formula or an optimum torque component current command (the q-axis current command iq*) and a magnetic flux component current command (the d-axis current command id*) obtained by being stored in a table in advance.

In the current-command generating unit 10 according to this embodiment, as shown in FIG. 2, the torque command T* is input to the d-axis-basic-current-command generating unit 11 and a d-axis basis current command id1* as a first d-axis current command is generated. As a method of generating the d-axis basic current command id1*, a maximum torque control method with which the motor 6 can generate desired torque with a minimum current is known. For example, there are a method of obtaining, based on the torque command T*, an optimum d-axis basic current command id1* referring to a map and a method of obtaining the optimum d-axis basic current command id1* according to an arithmetic formula. In both the methods, the d-axis-basic-current-command generating unit 11 can be configured using various publicly-known technologies. Therefore, more detailed explanation is omitted.

The d-axis basic current command id1* generated by the d-axis-basic-current-command generating unit 11 is input to the adder 14 and added up with the current command adjustment value dV, whereby the d-axis current command id* as a second d-axis current command is generated. The current command adjustment value dV mainly takes a negative value and gives correction in a negative direction to the d-axis basic current command id1*. Explaining more in detail, the current command adjustment value dV acts as a control output for performing so-called field weakening magnetic flux control for increasing the d-axis current command id* in the negative direction, generating a magnetic flux in a direction in which a magnetic flux generated by a permanent magnet incorporated in the motor 6 is cancelled and weakening an interlinkage magnetic flux of the motor 6 to drop the voltage of the motor 6. The current command adjustment value dV is a control output generated by the current-command adjusting unit 80. A detailed configuration of the current-command adjusting unit 80 is explained later.

The d-axis current command id* is output to the voltage-amplitude-index calculating unit 150 as an output of the current-command generating unit 10 and, on the other hand, input to the q-axis-current-command generating unit 15. In the q-axis-current-command generating unit 15, the q-axis current command iq* as a first q-axis current command is generated from the d-axis current command id* and the torque command T*. As a method of generating the q-axis current command iq*, like the method of generating the d-axis basic current command id1*, there are a method of obtaining the optimum q-axis current command iq* referring to a map and a method of obtaining the optimum q-axis current command iq* according to a calculation formula. In both the methods, the q-axis-current-command generating unit 15 can be configured using various publicly-known technologies. Therefore, more detailed explanation is omitted.

The operation of the voltage-amplitude-index calculating unit 150 is explained. Referring back to FIG. 1, the q-axis-current control unit 23 generates, based on Formula (4), the q-axis current error pqe obtained by subjecting a difference between the q-axis current command iq* and the q-axis current iq to proportional integral amplification. The d-axis-current control unit 20 generates, based on Formula (5), the d-axis current error pde obtained by subjecting a difference between the d-axis current command id* and the d-axis current id to proportional integral amplification.

$$pqe = (K1 + K2/s) \cdot (iq^* - iq) \tag{4}$$

$$pde = (K3 + K4/s) \cdot (id^* - id) \tag{5}$$

In the above formulas, K1 and K3 represent proportional gains and K2 and K4 represent integral gains.

According to necessity, the voltage-amplitude-index calculating unit 150 can be a control system that can select whether pqe and pde are used for control (i.e., whether values of pqe and pde are set to zero).

The d-axis-non-interference calculating unit 22 calculates, based on Formula (6), the d-axis feed forward voltage vdFF. The q-axis-decoupling calculating unit 21 calculates, based on Formula (7), the q-axis feed forward voltage vqFF.

$$vdFF = (R1 + s \cdot Ld) \cdot id^* - \omega \cdot Lq \cdot iq^* \tag{6}$$

$$vqFF = (R1 + s \cdot Lq) \cdot iq^* + \omega \cdot (Ld \cdot id^* + \phi a) \tag{7}$$

In the above formulas, R1 represents primary wiring resistance (Ω) of the motor 6, Ld represents d-axis inductance (H), Lq represents q-axis inductance (H), φa represents a permanent magnet magnetic flux (Wb), and s represents a differential operator.

The modulation-ratio calculating unit 30 calculates, based on the following formula, the modulation ratio PMF as a voltage amplitude index from the d-axis voltage command vd*, which is a sum of the d-axis current error pde and the d-axis feed forward voltage vdFF, the q-axis voltage command vq*, which is a sum of the q-axis current error pqe and the q-axis feed forward voltage vqFF, the reference phase angle θe, and the capacitor voltage EFC.

$$PMF = VM^*/VM\text{max} \tag{8}$$

VMmax and VM* in Formula (8) are represented by the following formulas:

$$VM\text{max} = (\sqrt{6}/\pi) \cdot EFC \tag{9}$$

$$MV^* = sqrt(vd^{*2} + vq^{*2}) \tag{10}$$

The modulation ratio PMF indicates a magnitude MV* of an inverter output voltage command vector as a ratio to a maximum voltage VMmax (defined by Formula (9)) that can be output by an inverter. For example, in the case of PMF=1.0, the magnitude VM* of the inverter output voltage command vector is equal to the maximum voltage VMmax that can be output by the inverter.

As it can be understood from Formulas (2) to (10), the modulation ratio PMF has a characteristic that the modulation ratio PMF changes according to the d-axis current command id* and the q-axis current command iq* generated by the current-command generating unit 10.

The control-phase-angle calculating unit 40 calculates, based on the following formula, the control phase angle θ from the d-axis voltage command vd*, which is the sum of the d-axis current error pde and the d-axis feed forward voltage vdFF, the q-axis voltage command vq*, which is the sum of the q-axis current error pqe and the q-axis feed forward voltage vqFF, and the reference phase angle θe.

$$\theta = \theta e + \pi + THV \tag{11}$$

THV in Formula (11) is represented by the following formula:

$$THV = \tan^{-1}(vd^*/vq^*) \tag{12}$$

Figure 3:
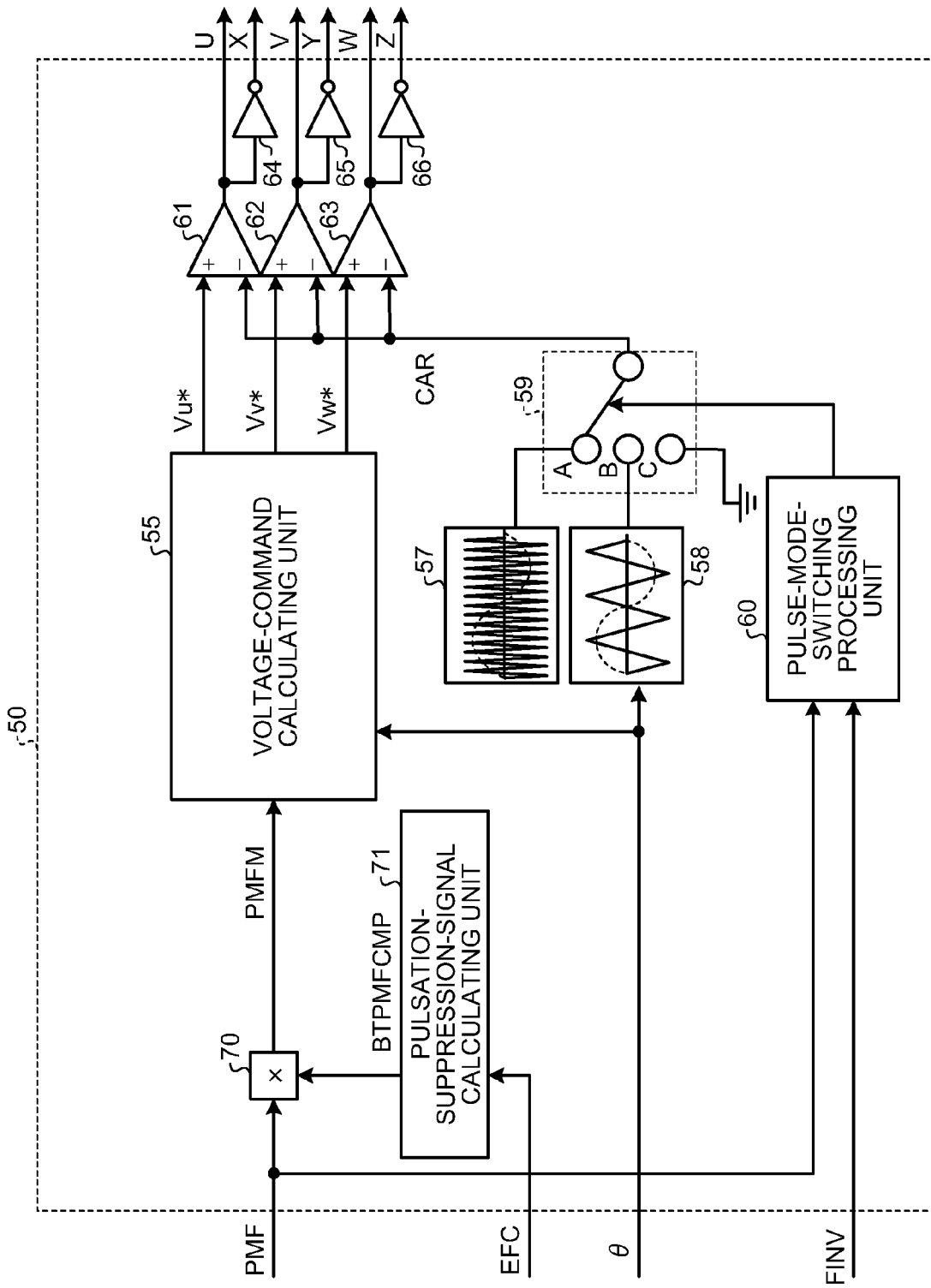
FIG. 3 is a diagram of a detailed configuration example of a voltage command/PWM signal generating unit shown in FIG. 1.

The configuration and the operation of the voltage command/PWM signal generating unit 50 are explained with reference to FIG. 3. FIG. 3 is a diagram of a detailed configuration example of the voltage command/PWM signal generating unit 50 shown in FIG. 1.

As shown in FIG. 3, the voltage command/PWM signal generating unit 50 includes a pulsation-suppression-signal calculating unit 71 that receives the capacitor voltage EFC as an input and generates a pulsation suppression signal BTP-MFCMP. The voltage command/PWM signal generating unit 50 multiplies the modulation ratio PMF with the pulsation suppression signal BTPMFCMP to generate PMFM, which is a voltage command amplitude command signal. The configuration of the pulsation-suppression-signal calculating unit 71 is explained later.

A voltage-command calculating unit 55 generates, based on the following formula, a U-phase voltage command Vu*, a V-phase voltage command Vv*, and a W-phase voltage command Vw*, which are three phase voltage commands, from the signal PMFM and the control phase angle θ.

$$Vu^* = PMFM \cdot \sin \theta \tag{13}$$

$$Vv^* = PMFM \cdot \sin(\theta - (2 \cdot \pi/3)) \tag{14}$$

$$Vw^* = PMFM \cdot \sin(\theta - (4\pi/3)) \tag{15}$$

The magnitudes of the U-phase voltage command Vu*, the V-phase voltage command Vv*, and the W-phase voltage command Vw* generated by the voltage-command calculating unit 55 are compared with a carrier signal CAR by comparators 61 to 63. Gate signals U, V, and W and inverted gate signals X, Y, and Z inverted through inverting circuits 64 to 66 are generated.

The carrier signal CAR is one of signals selected in a selection switch 59 by a pulse-mode-switching processing unit 60 functioning as a pulse-mode switching unit. Any one of an asynchronous multi-pulse (in general, about 1 kilohertz) carrier signal A generated by an asynchronous-multi-pulse-carrier-signal generating unit 57, a synchronous three-pulse carrier signal B generated by a synchronous-three-pulse-carrier generating unit 58, and a zero value C selected in a synchronous one-pulse mode is selected via the selection switch 59. The asynchronous multi-pulse carrier signal A and the synchronous three-pulse carrier signal B take values from −1 to 1 centering around zero.

The pulse-mode-switching processing unit 60 switches the selection switch 59 according to values of the modulation ratio PMF and the control phase angle θ. Specifically, in an area in which the modulation ratio PMF is low (equal to or lower than 0.785), the selection switch 59 is switched to the asynchronous multi-pulse carrier signal A side for selecting the asynchronous multi-pulse mode. When the modulation ratio PMF is larger than 0.785 and smaller than 1.0, the selection switch 59 is switched to the synchronous three-pulse carrier signal B side for selecting the synchronous pulse mode. When the modulation ratio PMF reaches about 1.0 (the modulation ratio PMF can be 0.99 or the like rather than just 1.0), the selection switch 59 is switched to the zero value C side. With such a configuration, at timing when the modulation ratio PMF is equal to about 1.0, it is possible to automatically switch the pulse mode to the synchronous one-pulse mode. Conversely, when the modulation ratio PMF is smaller than about 1.0, it is possible to automatically switch the pulse mode to the synchronous three-pulse mode. In other words, it is possible to easily transition an output voltage of the inverter 2 from the minimum to the maximum.

In the switching of the pulse mode, a signal referred to by the pulse-mode-switching processing unit 60 is desirably the modulation ratio PMF, which is a signal before the pulsation suppression signal BTPMFCMP explained later is reflected. By adopting a configuration in which the modulation ratio PMF is referred to, it is possible to prevent a pulse mode switching operation by the pulse-mode-switching processing unit 60 from becoming unstable.

The synchronous three-pulse mode is a pulse mode necessary for outputting a voltage having the modulation ratio PMF equal to or larger than 0.785, which cannot be output in the asynchronous multi-pulse mode. If an overmodulating method is used in an asynchronous multi-pulse mode, a synchronous five-pulse mode, a synchronous nine-pulse mode, or the like, it is possible to output a voltage equivalent to that in the synchronous three-pulse mode. However, when this method is used, the modulation ratio PMF and an output voltage of the inverter 2 are extremely nonlinear. Therefore, it is necessary to correct this nonlinearity. There is a disadvantage that a configuration is complicated.

In the above explanation, a threshold of the modulation ratio PMF for switching the asynchronous multi-pulse carrier signal and the synchronous three-pulse carrier signal is set to 0.785. However, a threshold other than 0.785 can be used.

As explained later, the carrier signal CAR compared with the voltage commands has at least an asynchronous multi-pulse carrier signal and a synchronous carrier signal. The carrier signal CAR can be selected according to a pulse mode selected by the pulse-mode-switching processing unit 60 functioning as a pulse-mode control unit.

The asynchronous multi-pulse carrier signal is a carrier signal having a frequency determined irrespective of the inverter output frequency FINV. The frequency is about 1000 Hz.

The frequency of the synchronous carrier signal such as the synchronous three-pulse carrier signal is determined as a function of the inverter output frequency FINV such that the number of pulses and the positions of the pulses included in an inverter output voltage are the same at a positive side half period and a negative side half period of the inverter output voltage. In this embodiment, an example in which only the synchronous three-pulse carrier signal is used as the synchronous carrier signal is explained. However, the synchronous carrier signal can be, for example, a synchronous five-pulse carrier signal or the like other than the synchronous three-pulse carrier signal. A plurality of synchronous carrier signals can be prepared and switched according to necessity.

In a state in which the asynchronous multi-pulse mode is selected, when the inverter output frequency FINV is near the frequency of the asynchronous multi-pulse carrier signal, the number of pulses included in a half period of the inverter output voltage decreases. The frequency of the asynchronous multi-pulse carrier signal is a value determined irrespective of the inverter output frequency FINV. Therefore, when the motor 6 is driven in such a state, the numbers of pulses and the positions of the pulses respectively included in the positive half period and the negative half period of the inverter output voltage are unbalanced or temporally fluctuate and positive and negative symmetry of the voltage applied to the motor 6 collapses. Current oscillation and torque pulsation occur in the motor 6 to cause noise and oscillation.

On the other hand, when the synchronous carrier signal is used, the numbers of pulses and the positions of the pulses respectively included in the positive half period and the negative half period of the inverter output voltage are equal and the positive and negative symmetry of the voltage applied to the motor 6 is secured. Therefore, it is possible to prevent current oscillation and torque pulsation from occurring in the motor 6 and stably drive the motor 6.

Concerning the synchronous one-pulse mode, the number of pulses included in an inverter output voltage half period is always one and fixed without temporally changing. Therefore, the number of pulses and the positions of the pulses are the same at the positive half period and the negative half period of the inverter output voltage. The positive and negative symmetry of the voltage applied to the motor 6 can be secured. Therefore, it is not feared that current oscillation and torque pulsation occur in the motor 6.

A configuration for finely adjusting switching timing for the pulse mode according to the control phase angle θ can be added. There is an effect that it is possible to suppress ripple of a motor current during pulse mode switching.

Figure 4:
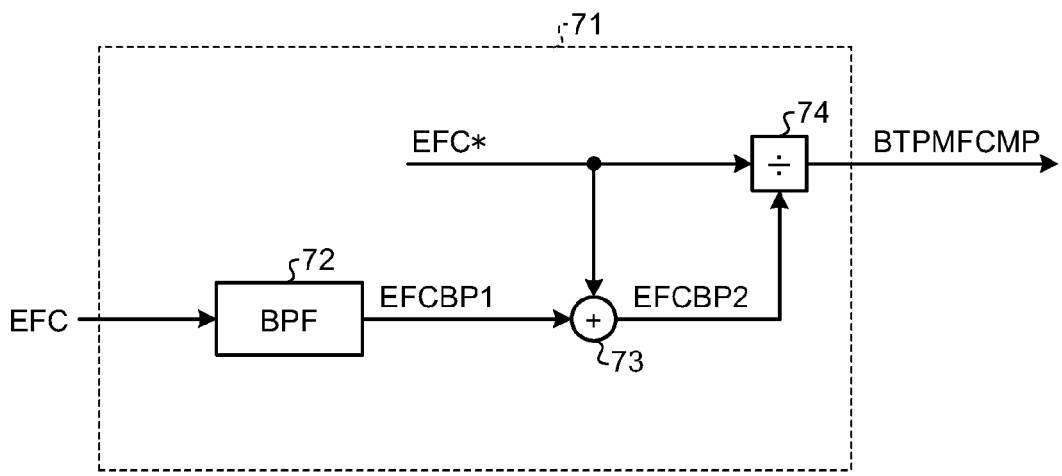
FIG. 4 is a diagram of a detailed configuration example of a pulsation-suppression-signal calculating unit shown in FIG. 3.

The configuration and the operation of the pulsation-suppression-signal calculating unit 71 functioning as a pulsation-suppression-signal generating unit are explained with reference to FIG. 4. FIG. 4 is a diagram of a detailed configuration example of the pulsation-suppression-signal calculating unit 71 shown in FIG. 3.

In the pulsation-suppression-signal calculating unit 71, as shown in FIG. 4, the capacitor voltage EFC is input to a band pass filter (hereinafter referred to as "BPF") 72. The capacitor voltage EFC is filtered by the BPF 72 and a signal EFCBP1 is generated. The BPF 72 is set such that a 2f component of a power supply frequency of the AC power supply 230 can be efficiently extracted.

In an adder 73, a signal EFCBP2 as a sum of the generated signal EFCBP1 and a capacitor voltage command EFC*, which is a voltage command to the capacitor 1, is generated. The capacitor voltage command EFC* is a target value of the capacitor voltage EFC at the time when the converter 220 performs control for converting an AC voltage of the AC power supply 230 into a DC voltage (=the capacitor voltage EFC). Usually, the capacitor voltage command EFC* takes a value of about 1500 volts to 3000 volts.

Instead of the capacitor voltage command EFC*, a signal obtained by putting the capacitor voltage EFC through a LPF (not shown) and removing an AC component to leave only a DC component can be generated. This signal can be added to the signal EFCBP1 by the adder 73 to generate the signal EFCBP2.

The capacitor voltage command EFC* and the signal EFCBP2, which is an output of the adder 73, are input to a divider 74. In the divider 74, the capacitor voltage command EFC* is divided by the signal EFCBP2. A division result is output as the pulsation suppression signal BTPMFCMP.

Like the signal EFCBP2, instead of the capacitor voltage command EFC*, a signal obtained by putting the capacitor voltage EFC through the LPF (not shown) and removing an AC component to leave only a DC component can be generated. This signal can be divided by the signal EFCBP2 by the divider 74 to generate the pulsation suppression signal BTPMFCMP.

The pulsation suppression signal BTPMFCMP obtained in this way indicates an inverse number of a ratio of the capacitor voltage EFCBP2 including a pulsation component of the power supply 2f component to a DC component of the capacitor voltage EFC.

Figure 5:
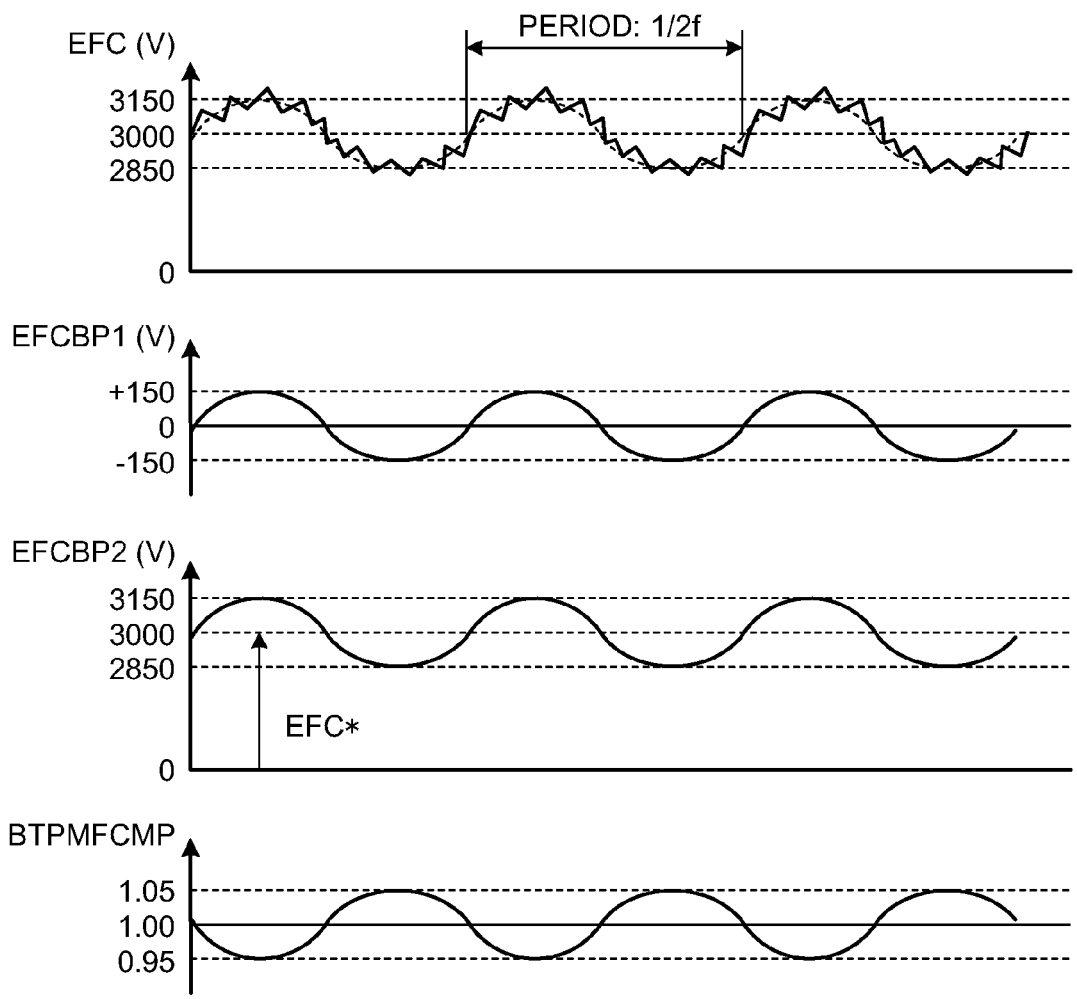
FIG. 5 is a diagram of an internal state example of the pulsation-suppression-signal calculating unit in the first embodiment.

FIG. 5 is a diagram of an internal state example of the pulsation-suppression-signal calculating unit 71 in the first embodiment. In FIG. 5, an internal state in which a center value of the capacitor voltage EFC is 3000 V is shown as an example.

As shown in FIG. 5, the capacitor voltage EFC includes, together with the power supply 2f component, a ripple component generated by a switching operation of the converter 220 and having a frequency higher than that of the power supply 2f component (see a wavy form in an upper stage part of the figure).

The signal EFCBP1 is a signal from which the ripple component is removed by the function of the BPF 72 and including only the power supply 2f component (see a wavy form in the middle upper part of the figure).

The signal EFCBP2 is a value obtained by adding EFC*, which is a capacitor voltage command, to the signal EFCBP1. Only the power supply 2f component is included in the signal EFCBP2 as a fluctuation component (see a wavy form in a middle lower stage part of the figure).

It is seen that the pulsation suppression signal BTPMFCMP indicates an inverse number of the capacitor voltage EFCBP2 including the pulsation component of the power supply 2f component with respect to the DC component of the capacitor voltage EFC (see a wavy form in a middle lower stage part of the figure).

The pulsation suppression signal BTPMFCMP, which is an output of the pulsation-suppression-signal calculating unit 71, is input to a multiplier 70 of the voltage command/PWM signal generating unit 50 and multiplied with the modulation ratio PMF (see FIG. 3). By multiplying the pulsation suppression signal BTPMFCMP with the modulation ratio PMF, it is possible to generate the voltage command amplitude command signal PMFM for cancelling the pulsation component by the power supply 2f component of the capacitor voltage EFC.

As shown in FIG. 3, an output voltage commands to the inverter 2 are generated based on the voltage command amplitude command signal PMFM. In this way, it is possible to adjust the pulse width of a voltage output by the inverter to cancel the power supply 2f component. Therefore, it is possible to solve a problem in which the AC motor generates an over current and excessively large torque pulsation occurs in a domain where the inverter output frequency FINV and the frequency of the power supply 2f component are close to each other.

Figure 6:
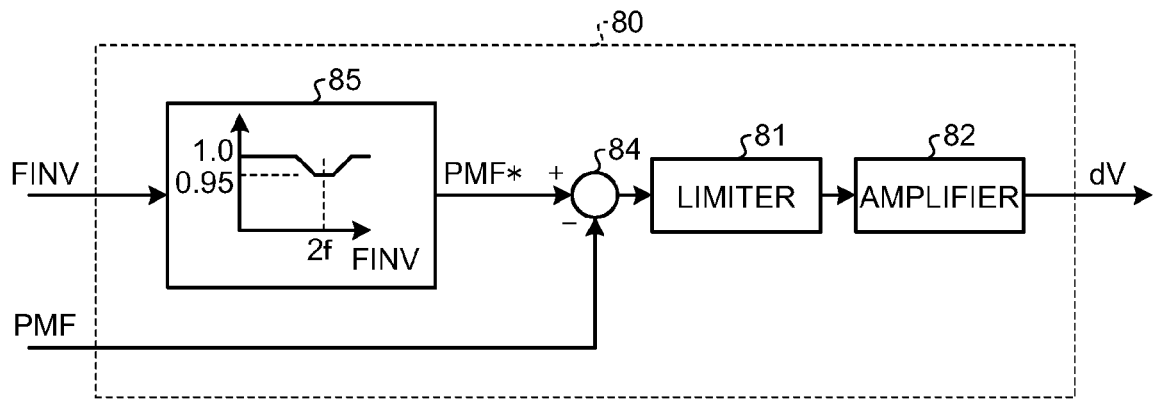
FIG. 6 is a diagram of a detailed configuration example of a current-command adjusting unit shown in FIG. 1.

The configuration and the operation of the current-command adjusting unit 80 are explained with reference to FIG. 6. FIG. 6 is a diagram of a detailed configuration example of the current-command adjusting unit 80 shown in FIG. 1.

The current-command adjusting unit 80 is a component having a function of generating, based on the inverter output frequency FINV, the current command adjustment value dV. The current-command adjusting unit 80 includes, as shown in FIG. 6, a modulation-ratio-command generating unit 85, a subtracter 84, a limiter 81, and an amplifier 82 (having a gain K).

The modulation-ratio-command generating unit 85 operates as a voltage-amplitude-target-command generating unit and generates, based on the inverter output frequency FINV, a modulation ratio command PMF*, which is a voltage amplitude target command. The subtracter 84 outputs a value obtained by subtracting the modulation ratio PMF from the modulation ratio command PMF*. The limiter 81 receives an output of the subtracter 84 as an input signal. When a sign of the input signal is plus, the limiter 81 sets an output to zero. When a sign of the input signal is minus, the limiter 81 directly outputs the input signal. The amplifier 82 (having the gain K) amplifies the output signal and outputs the amplified signal as the current command adjustment value dV. The current command adjustment value dV is represented as indicated by the following formula:

$$dV = LIM(PMF^* - PMF) \cdot K \qquad (16)$$

where, LIM( ) represents a function for limiting upper and lower limits of a value in the parentheses according to the method explained above.

Figure 7:
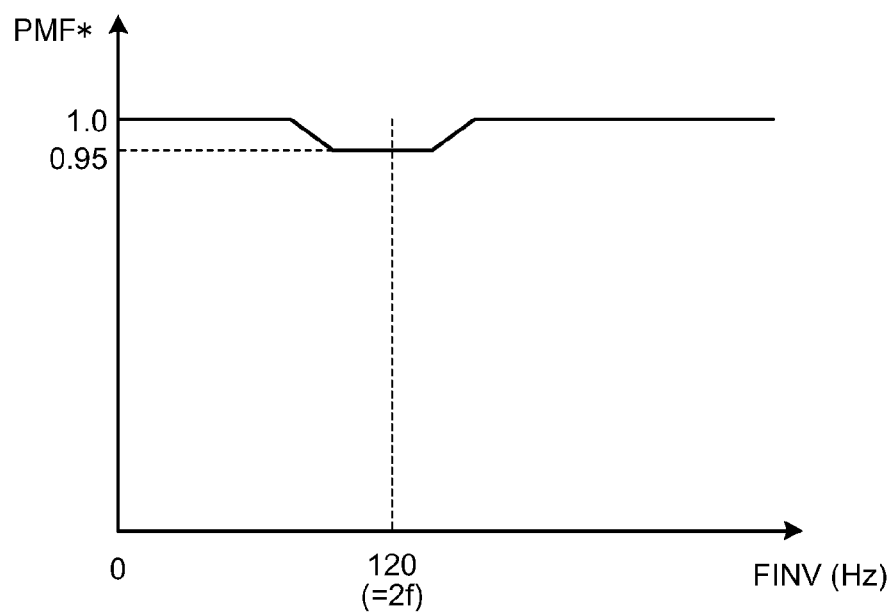
FIG. 7 is an enlarged diagram of a modulation-ratio-command generating unit shown in FIG. 6.

The configuration and the operation of the modulation-ratio-command generating unit 85 are explained with reference to FIG. 7. FIG. 7 is an enlarged diagram of the modulation-ratio-command generating unit 85 shown in FIG. 6.

As explained above, the modulation-ratio-command generating unit 85 generates, based on the input inverter output frequency FINV, the modulation ratio command PMF*. As shown in FIG. 7, the modulation ratio command PMF* is set to, for example, 0.95 in a domain where the inverter output frequency FINV is around 120 hertz (120 Hz±30 Hz) and set to 1.0 in other domains.

By configuring the modulation-ratio-command generating unit 85 in this way, when the inverter output frequency FINV is in the domain around 120 hertz (120 Hz±30 Hz), it is possible to generate and control the current command adjustment value dV such that the modulation ratio PMF is 0.95.

A domain in which the modulation ratio PMF is set to 0.95 is explained as the domain where the inverter output frequency FINV is around 120 hertz (120 Hz±30 Hz). However, this is an example in which the frequency of the AC power supply 230 is 60 hertz. This is because 120 hertz is equivalent to a 2f component of 60 hertz. On the other hand, when the frequency of the AC power supply 230 is 50 hertz, because the 2f component is 100 hertz, the domain where the modulation ratio PMF is set to 0.95 is a domain where the inverter output frequency FINV is 100 hertz (100 Hz±30 Hz).

With the configuration based on FIGS. 6 and 7, at a point when the modulation ratio PMF exceeds the predetermined modulation ratio command PMF*, the input to the limiter 81 decreases to be equal to or smaller than zero and the negative current command adjustment value dV can be generated. Therefore, it is possible to perform weakening magnetic flux control for causing an output voltage of the inverter 2 to coincide with a value set by the modulation ratio command PMF*.

Specifically, when a voltage command has a margin with respect to a maximum output voltage of the inverter 2, the current command adjustment value dV is not output. At a point when the modulation ratio PMF exceeds the modulation ratio command PMF* (a point when the voltage command exceeds the maximum voltage set by the modulation ratio command PMF*), a negative value occurs in the output of the limiter 81 and the current command adjustment value dV is output. Therefore, the unnecessary d-axis current id is not fed and the electric current of the motor 6 can be minimized.

Figure 8:
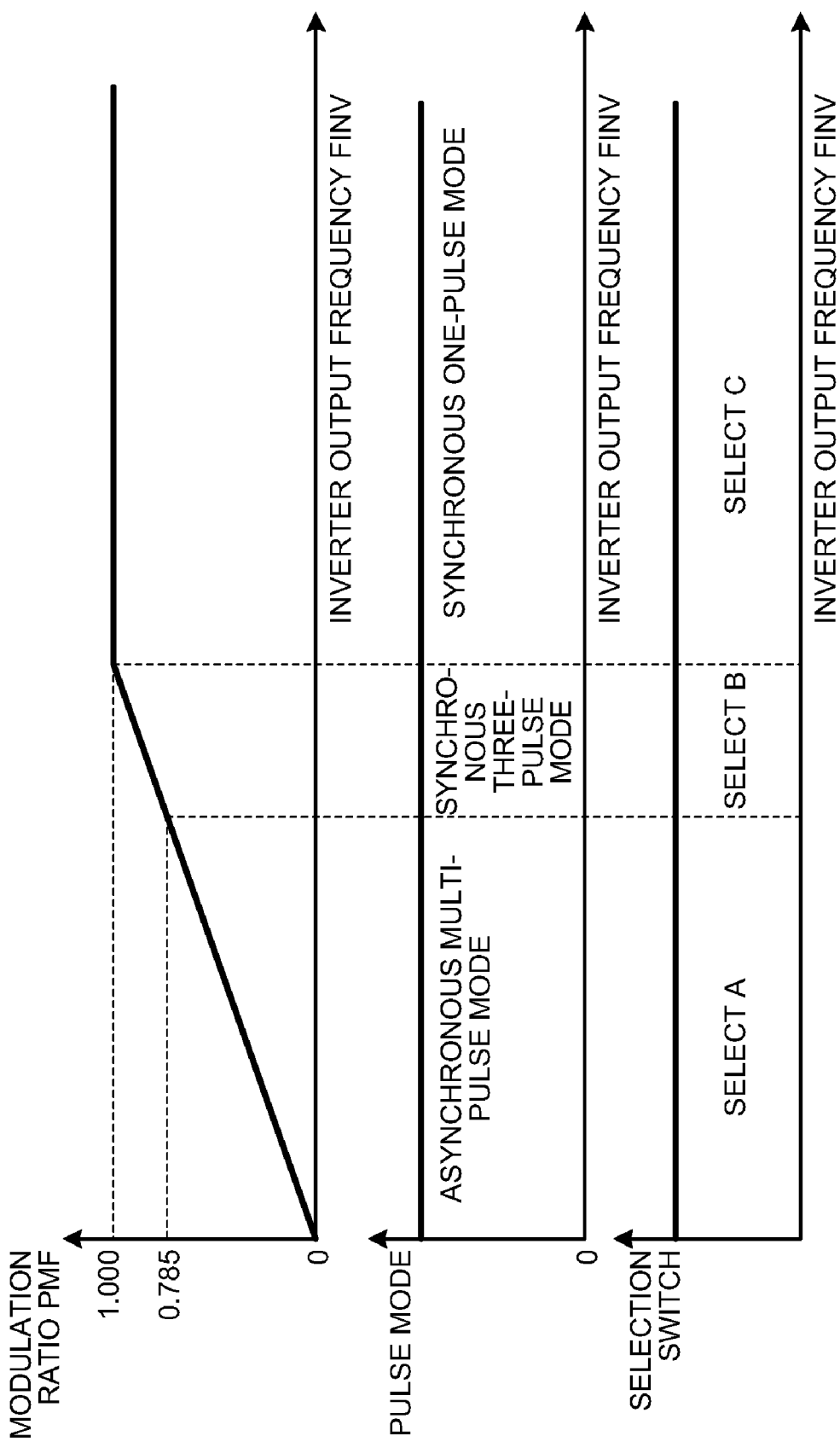
FIG. 8 is a diagram for explaining a relation between an inverter output frequency FINV and transition of a modulation ratio PMF, transition of a pulse mode, and transition of the operation of a selection switch (see FIG. 3) in the first embodiment.

FIG. 8 is a diagram for explaining a relation between the inverter output frequency FINV and transition of the modulation ratio PMF, transition of the pulse mode, and transition of the operation of the selection switch 59 (see FIG. 3) in the first embodiment. Power acceleration of an electric motor vehicle from a stop state is explained as an example below.

As shown in FIG. 8, when the electric motor vehicle runs at low speed, i.e., when the inverter output frequency FINV is low, the modulation ratio PMF is small, the pulse mode is the asynchronous multi-pulse mode, and A is selected as the selection switch 59. On the other hand, when the speed of the electric motor vehicle increases and the modulation ratio PMF increases to be equal to or higher than 0.785, the output voltage of the inverter 2 is saturated in the asynchronous multi-pulse mode. Therefore, the selection switch 59 is switched to B and the pulse mode is switched to the synchronous three-pulse mode. When the speed of the electric motor vehicle further increases and the modulation ratio PMF reaches 1.0, the selection switch 59 is switched to C and the pulse mode is switched to the synchronous one-pulse mode.

Deceleration of the electric motor vehicle by the application of a regeneration brake is not shown in the figure. However, according to order opposite to the order explained above, the pulse mode transitions from the synchronous one-pulse mode to the synchronous three-pulse mode and the asynchronous multi-pulse mode. The selection switch 59 is switched in order of C, B, and A.

Effects of the power converting apparatus for motor driving according to this embodiment are explained in relation to control operations for the components explained above.

Figure 9:
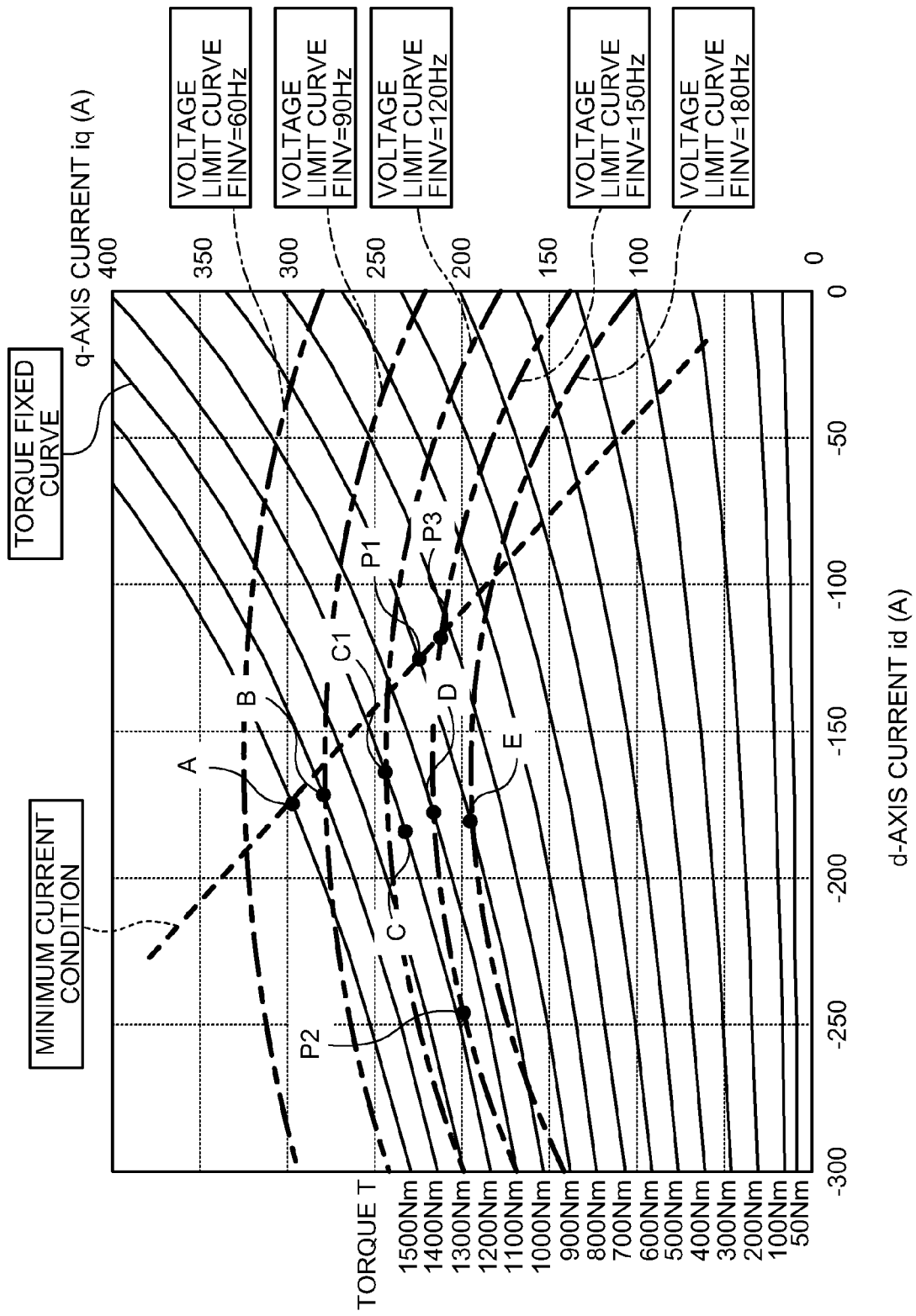
FIG. 9 is a diagram of general control characteristics of permanent magnet synchronous motors in the first embodiment of the present invention and an example in the past.

FIG. 9 is a diagram of general control characteristics of permanent magnet synchronous motors in the first embodiment of the present invention and an example in the past. The control characteristics shown in FIG. 9 are control characteristics concerning permanent magnet synchronous motors designed for electric motor vehicles. It is assumed that maximum output torque is 1500 Newton meters and the input voltage EFC is 3000 volts. A permanent magnet synchronous motor operated according to other parameters assumes similar characteristics.

In FIG. 9, the abscissa represents the d-axis current id and the ordinate represents the q-axis current iq. A plurality of curves (solid lines) present from the upper right to the lower left in the figure is a torque fixed curve and is a curve indicating a relation between the d-axis current id and the q-axis current iq at respective torques T described at the left end of the figure (a relation between current vectors). A curve (a broken line) from the upper left to the lower right in the figure is a curve indicating a minimum current condition and is a curve on which a motor current is minimized when certain torque T is output. In other words, the curve is a curve indicating a condition under which so-called maximum torque/current control for generating maximum torque with a minimum current is possible.

If a current vector is controlled to a crossing point of the curve indicating the minimum current condition and the torque fixed curve, it is possible to obtain the torque T with a minimum current. By performing such control, there is an advantage that it is possible to minimize a copper loss and an inverter loss of the motor 6 when certain torque T is obtained and it is possible to reduce the motor 6 and the inverter 2 in size and weight. For example, when it is desired to output the torque T of 1000 Newton meters, if current control is performed by the inverter 2 such that the d-axis current id is near −125 amperes and the q-axis current iq is near 225 amperes (a P1 point shown in the figure), 1000 Newton meters can be generated by the minimum current.

In the figure, curves (alternate long and short dash lines) drawn in a mountain-like shape are voltage limit curves, which are induced voltage fixed curves, and are curves indicating a relation between the d-axis current id and the q-axis current iq with which a terminal voltage of the motor 6 is maximized in a certain inverter output frequency FINV (a relation between current vectors). In the figure, voltage limit curves in five cases (60 Hz, 90 Hz, 120 Hz, 150 Hz, and 180 Hz) in which the inverter output frequency FINV is set as a parameter under a condition that the input voltage EFC of the inverter 2 is set to 3000 V are shown.

A combination the d-axis current id and the q-axis current iq that can be logically selected (a current vector) is on the inner side of the voltage limit curves (the lower side of the curves). When the motor 6 is operated with current vectors present on lines of the voltage limit curves, a line voltage of the motor 6 is maximized (i.e., a state in which the modulation ratio PMF of the inverter 2 is 1.0 and a maximum voltage is output). The torque T that can be output at this point is the torque T at a crossing point of the voltage limit curve and the torque fixed curve.

When the motor 6 is operated with current vectors present on the inner side (the lower side) of the voltage limit curves, the line voltage of the motor 6 takes a value equal to or larger than zero and smaller than the maximum value (i.e., the modulation ratio PMF of the inverter 2 is smaller than 1.0).

Current vectors present on the outer side of the voltage limit curves (the upper side of the curves) cannot be selected because the current vectors are in an area exceeding the maximum output voltage of the inverter 2.

As it can be understood from the voltage limit curves at the inverter output frequencies FINV (60 Hz, 90 Hz, 120 Hz, 150 Hz, and 180 Hz) in the five cases shown in FIG. 9, as the speed of the motor 6 increases and the inverter output frequency FINV increases, the voltage limit curves move to the lower side of the figure, current vectors that can be selected are limited, and a maximum value of the torque T that can be output decreases. As the inverter output frequency FINV increases, the torque T that could be generated on the curve indicating the minimum current condition also decreases.

When the capacitor voltage EFC rises, the voltage limit curve at the same inverter output frequency FINV moves to the upper side in the figure. When the capacitor voltage EFC falls, the voltage limit curve at the same inverter output frequency FINV moves to the lower side in the figure.

For example, when the inverter output frequency FINV is 60 hertz, an operation point satisfying the minimum current condition at the maximum torque 1500 Newton meters (near the d-axis current id=−175 A, near the q-axis current iq=295 A, an A point in the figure) is a point sufficiently apart to the lower side from the voltage limit curve.

On the other hand, when the inverter output frequency FINV is 150 hertz, a maximum torque that could be generated is about 1200 Newton meters (a P2 point in the figure) near the d-axis current id=−245 A and near the q-axis current iq=200 A on the voltage limit curve. Similarly, a maximum torque that could be generated under the minimum current condition is about 930 Newton meters (a P3 point in the figure) near the d-axis current id=−120 A and near the q-axis current iq=210 A on the voltage limit curve. The operation under the minimum current condition is impossible in an area between 930 Newton meters to 1200 Newton meters. This is an area where operation is possible by performing weakening magnetic flux control for negatively increasing the d-axis current id.

However, as the weakening magnetic flux control is carried out deeper (as the d-axis current id is negatively increased), a current vector formed by the d-axis current id and the q-axis current iq increase and the electric current of the motor 6 increases.

Specifically, to minimize a copper loss of the motor 6 and a loss of the inverter 2, it is desirable to control the inverter 2 to select a current vector (a combination of the d-axis current id and the q-axis current iq) on the minimum current condition curve as much as possible and cause the motor 6 to generate desired torque. When the inverter output frequency FINV increases according to an increase in rotating speed of the motor 6, in an area where the desired torque cannot be output on the minimum current condition curve because of the limitation of the voltage limit curve, in general, the d-axis current id is negatively increased and the weakening magnetic flux control is performed.

Besides the control under the minimum current condition explained above (the maximum torque/current control), it is also possible to control a current vector on a maximum efficiency curve (not shown) on which a loss of the motor 6 including an iron loss of the motor 6 is minimized and apply maximum efficiency control for operating the motor 6.

An operation characteristic to the present invention performed around an area where switching control to the synchronous one-pulse mode (i.e., an area where the modulation ratio PMF takes a value close to 1.0) or when the inverter output frequency FINV is near the power supply 2f component during operation in the synchronous one-pulse mode is explained.

Figure 14:
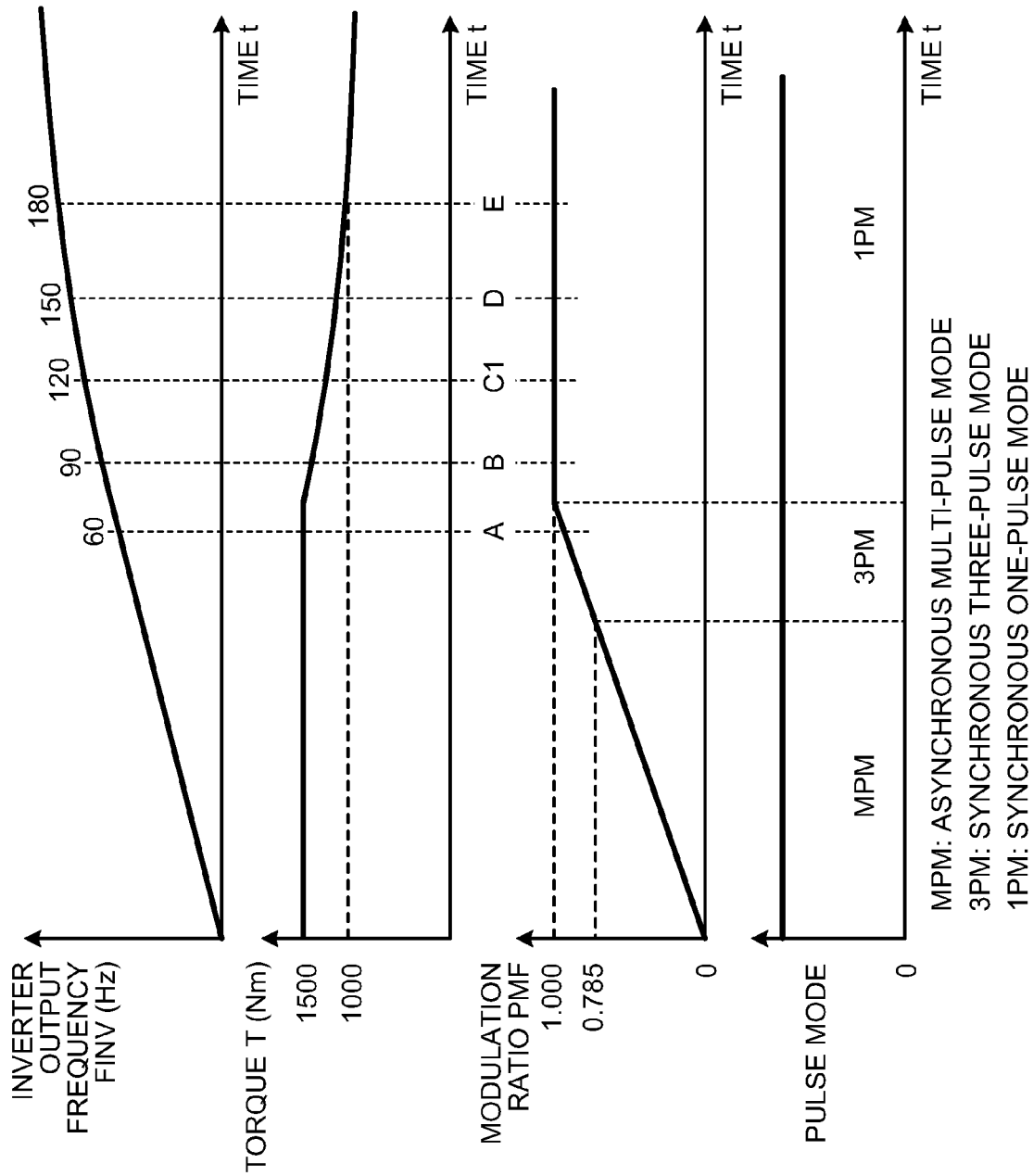
FIG. 14 is a diagram for explaining operation states in the example in the past.

First, a control operation in the example in the past is explained to clarify details of a problem. Then, problem solving means in the first embodiment of the present invention is explained with reference to FIG. 14, wherein MPM, 3PM and 1PM denote, asynchronous multi-pulse mode, synchronous three-pulse mode, and synchronous one-pulse mode, respectively. FIG. 14 is a diagram for explaining an operation state in the example in the past. A control example in which the motor 6 is started and power-accelerated from a state in which the motor 6 is stopped is shown in FIG. 14. Operation points A, B, C1, D, and E shown in FIG. 14 respectively correspond to operation points A, B, C1, D, and E shown in FIG. 9.

In FIG. 14, first, the inverter 2 is started at time zero, a command of the torque T is set to 1500 Newton meters, and a voltage is applied to the motor 6 to start acceleration. At this point, the modulation ratio PMF increase from zero in proportion to the inverter output frequency FINV. Until the modulation ratio PMF reaches 0.785 from the time zero, the asynchronous multi-pulse mode is selected as the pulse mode of the inverter 2 and the torque T is fixed at 1500 Newton meters. Therefore, the motor 6 linearly accelerates and the inverter output frequency FINV linearly increases.

At a point when the modulation ratio reaches 0.785, the pulse mode is switched to the synchronous three-pulse mode. Between the A point and the B point, because the modulation ratio PMF reaches the maximum value 1.0, the pulse mode is switched from the synchronous three-pulse mode to the synchronous one-pulse mode. Between the A point (the inverter output frequency FINV=60 Hz) and the B point (the inverter output frequency FINV=90 Hz), the command of the torque T is reduced from 1500 Newton meters in inverse proportion to the inverter output frequency FINV. After the modulation ratio PMF reaches 1.0, the generated current command adjustment amount dV increases to a negative side according to an increase in the inverter output frequency FINV. Therefore, because the d-axis current command id* negatively increases, the weakening magnetic flux control is performed. Consequently, the d-axis current command id* is adjusted such that the modulation ratio PMF coincides with the modulation ratio command PMF* (=1.0).

A track of the current vector in the control state explained above is explained with reference to FIG. 9. In FIG. 9, as explained above, because the operation point A is located on the lower side of the voltage limit curve and away from the voltage limit curve, the modulation ratio PMF is smaller than 1.0 and an output voltage of the inverter 2 is a value smaller than a maximum voltage that can be output.

At the operation point B, the command of the torque T is 1400 Newton meters and the current vector is controlled to a point where the d-axis current command id* is about −170 amperes and the q-axis current command iq* is about 277 amperes. At this operation point B, the current vector is also maintained on the voltage limit curve at FINV=90 Hz. The current command adjustment value dV is generated and controlled such that the modulation ratio PMF is 1.0.

At the operation point C1, the command of the torque T is 1200 Newton meters and the current vector is controlled to a point where the d-axis current command id* is −160 amperes and the q-axis current command iq* is about 243 amperes. At this operation point C1, the current vector is also maintained on the voltage limit curve at FINV=120 Hz. The current command adjustment value dV is generated and controlled such that the modulation ratio PMF is 1.0.

At the operation point D, the command of the torque T is 1100 Newton meters and the current vector is controlled to a point where the d-axis current command id* is −177 amperes and the q-axis current command iq* is about 220 amperes. At this operation point D, the current vector is also maintained on the voltage limit curve at FINV=150 Hz. The current command adjustment value dV is generated and controlled such that the modulation ratio PMF is 1.0.

At the operation point E, the command of the torque T is 1000 Newton meters and the current vector is controlled to a point where the d-axis current command id* is −180 amperes and the q-axis current command iq* is about 195 amperes. At this operation point E, the current vector is also maintained on the voltage limit curve at FINV=180 Hz. The current command adjustment value dV is generated and controlled such that the modulation ratio PMF is 1.0.

In this way, in the control example in the past, a control operation point transitions from the operation point A to the operation points B, C1, D, and E. After the modulation ratio PMF reaches 1.0, the current command adjustment value dV is generated to maintain the output voltage of the inverter 2 at a maximum value that can be output while outputting the torque T (to maintain the modulation ratio PMF=1.0). The weakening magnetic flux control is performed according to the d-axis current command id* including the current command adjustment amount dV.

According to the control, in the control example in the past, after the modulation ratio reaches 1.0, to maintain the modulation ratio PMF at 1.0 and maintain the applied voltage to the AC motor at the maximum, the synchronous one-pulse mode is selected in the switching state of the inverter circuit. In the operation area of this synchronous one-pulse mode, as explained above, because adjustment of the pulse width cannot be performed, control for cancelling the power supply 2f component cannot be performed, in particular, in a domain where the inverter output frequency FINV is near the power supply 2f component. Therefore, a problem occurs in that the AC motor generates an over current and excessively large torque pulsation occurs.

Figure 10:
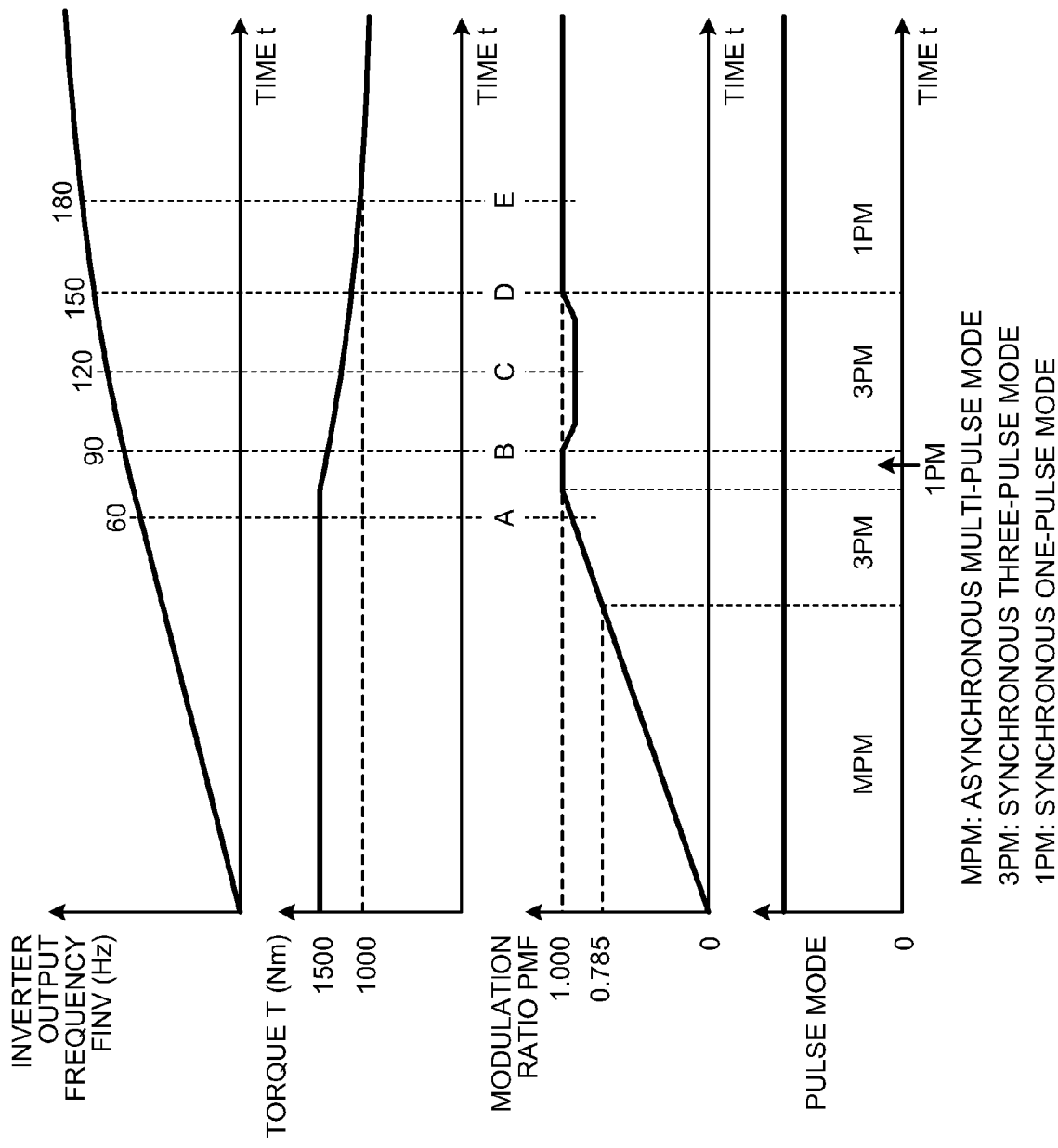
FIG. 10 is a diagram for explaining control states in the first embodiment of the present invention.

A control operation in the first embodiment for solving the problem is explained with reference to FIG. 10. FIG. 10 is a diagram for explaining control states in the first embodiment of the present invention. An example of control performed when the motor 6 is started and power-accelerated from a state in which the motor 6 is stopped is shown. Operation points A, B, C, D, and E shown in FIG. 10 respectively correspond to the operation points A, B, C, D, and E shown in FIG. 9.

In FIG. 10, first, the inverter 2 is started at time zero, a command of the torque T is set to 1500 Newton meters, and a voltage is applied to the motor 6 to start acceleration. The modulation ratio PMF increase from zero in proportion to the inverter output frequency FINV. Until the modulation ratio PMF reaches 0.785 from the time zero, the asynchronous multi-pulse mode is selected as the pulse mode of the inverter 2 and the torque T is fixed at 1500 Newton meters. Therefore, the motor 6 linearly accelerates and the inverter output frequency FINV linearly increases.

At a point when the modulation ratio reaches 0.785, the pulse mode is switched to the synchronous three-pulse mode. Between the A point and the B point, because the modulation ratio PMF reaches the maximum value 1.0, the pulse mode is switched from the synchronous three-pulse mode to the synchronous one-pulse mode. Between the A point (the inverter output frequency FINV=60 Hz) and the B point (the inverter output frequency FINV=90 Hz), the command of the torque T is reduced from 1500 Newton meters in inverse proportion to the inverter output frequency FINV. After the modulation ratio PMF reaches 1.0, the generated current command adjustment amount dV negatively increases according to an increase in the inverter output frequency FINV. Therefore, because the d-axis current command id* negatively increases, the weakening magnetic flux control is performed. Consequently, the d-axis current command id* is adjusted such that the modulation ratio PMF coincides with the modulation ratio command PMF* (=1.0). The control operation so far is equivalent to that in the example in the past.

On the other hand, a domain between the operation point B and the operation point D is a domain where the inverter output frequency FINV and the power supply 2f component are near each other. The operation point C is an operation point where the inverter output frequency FINV is 120 hertz and is a point where the frequency of the power supply 2f component at the time when the frequency of the AC power supply 230 is 60 hertz and the inverter output frequency FINV exactly coincide with each other.

Therefore, in this embodiment, in a range from the operation point B to the operation point D that is a range in which the inverter output frequency FINV and the power supply 2f component near to each other or coincide with each other, the modulation ratio command PMF* is reduced from 1.0 to 0.95. According to this control, a deviation between the modulation ratio PMF and the modulation ratio command PMF* occurs. Therefore, the current command adjustment value dV is generated based on this deviation. The generated d-axis current command id* is operated based on the current command adjustment value dV to further increase in the negative direction. Consequently, the d-axis current command id* and the q-axis current command iq* are generated as a current vector located on the fixed torque curve corresponding to the command of the torque T and on the inner side (the lower side) of the voltage limit curve near FINV=120 Hz. According to the d-axis current command id* and the q-axis current command iq* generated in this way, the weakening magnetic flux control applied to the motor 6 becomes deeper and the induced voltage of the motor 6 further falls. Therefore, the modulation ratio PMF also falls. The modulation ratio PMF is controlled to coincide with the modulation ratio command PMF*.

In this domain, the power converting apparatus for motor driving according to this embodiment reduces the modulation ratio PMF to be lower than a normal modulation ratio to switch the pulse mode to the synchronous three-pulse mode, which is a synchronous pulse mode. Therefore, according to the pulsation suppression signal BTPMFCMP, which is an output of the pulsation-suppression-signal calculating unit 71, it is possible to perform pulse width adjustment for an output voltage output by the inverter 2. It is possible to perform the control for cancelling the power supply 2f component. According to this control, it is possible to solve the problem in that the AC motor generates an over current and excessively large torque pulsation occurs.

Because the synchronous three-pulse mode, which is the synchronous pulse mode, is selected as the pulse mode, the numbers of pulses and the positions of the pulses respectively included in the positive half period and the negative half period of the inverter 2 are equal and the positive and negative symmetry of the voltage applied to the motor 6 is secured. Therefore, it is possible to prevent current oscillation and torque pulsation from occurring in the motor 6, prevent occurrence of noise and oscillation due to the current oscillation and torque pulsation, and perform stable driving of the motor 6. Operations after the operation point D are the same as those in the example in the past explained above.

In this way, in the control according to this embodiment, the operation point transitions in order of the operation points A, B, C, D, and E. The commands of the torque T at the operation points A, B, C, D, and E are respectively 1500 Newton meters, 1400 Newton meters, 1200 Newton meters, 1100 Newton meters, and 1000 Newton meters. The commands of the torque T are the same as those at the operation points A, B, C1, D, and E of the example in the past. In other words, in this embodiment, while the control for cancelling the power supply 2f component is performed, an output characteristic of the torque T is not affected at the operation points including the operation point C.

On the other hand, because the operation point C1 in the example in the past and the operation point C in this embodiment are located on the same torque fixed curve (1200 Newton meters) corresponding to a predetermined torque command value, torque output by the motor 6 is the same at both the operation point C1 and the operation point C. In other words, in this embodiment, it is possible to reduce the modulation ratio PMF to, for example, 0.95 by, while maintaining the output torque of the motor 6 the same, dropping the induced voltage of the motor 6 and dropping the output voltage of the inverter 2. Because the modulation ratio PMF is reduced to be lower than the normal modulation ratio and the pulse mode is switched to the synchronous three-pulse mode, which is the synchronous pulse mode, it is possible to adjust the pulse width of a voltage output by the inverter 2 according to an output of the pulsation-suppression-signal calculating unit 71 and perform the control for cancelling the power supply 2f component. Consequently, the problem in the past in that the AC motor generates an over current and excessively large torque pulsation occurs is solved.

The current commands (the d-axis current command id* and the q-axis current command iq*) with which the modulation ratio PMF coincides with the modulation ratio command PMF* are generated. Therefore, it is possible to reduce the modulation ratio PMF to, for example, 0.95 by, while maintaining the output torque of the motor 6 at a predetermined value, dropping the induced voltage of the motor 6 and dropping the output voltage of the inverter 2.

In the example explained above, the motor 6 is power-accelerated from the stopped state. However, the configuration explained in this embodiment can also be applied when the motor 6 is subjected to regenerative operation and stopped during high-speed rotation.

Second Embodiment

In the first embodiment, the configuration is disclosed in which a current command adjustment amount for adjusting a current command for the power converting apparatus for motor driving is suitably controlled or switching of the pulse mode is suitably controlled to enable adjustment of the pulse width of the voltage output by the inverter 2 and make it possible to effectively perform the control for cancelling the power supply 2f component included in the output voltage of the inverter 2. In a second embodiment, a configuration is disclosed in which a converter voltage command for controlling the converter 220 is further suitably generated to make it possible to effectively reduce an electric current fed to the motor 6.

Figure 11:
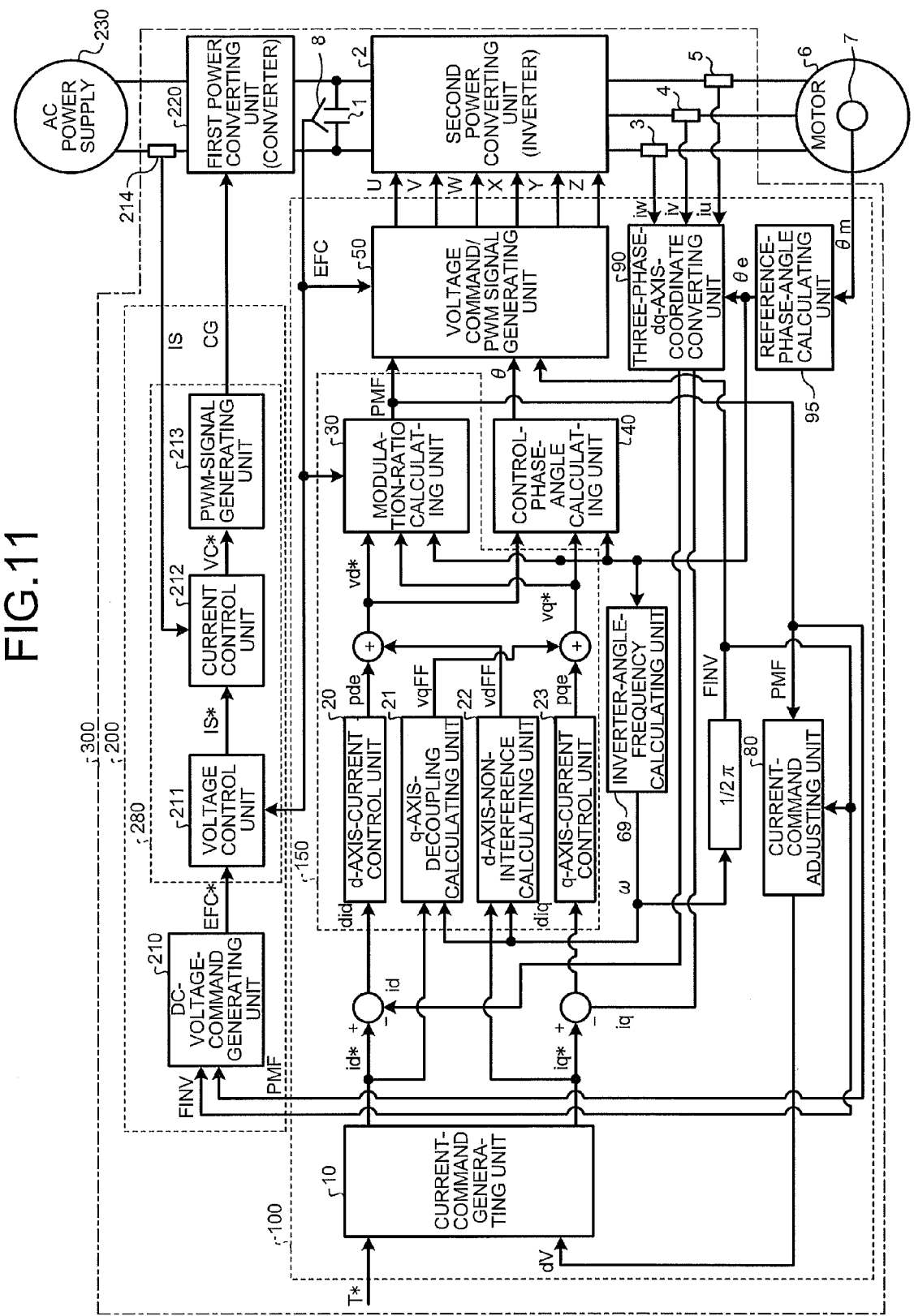
FIG. 11 is a diagram of a configuration example of a power converting apparatus for motor driving in a second embodiment of the present invention.

FIG. 11 is a diagram of a configuration example of a power converting apparatus for motor driving according to the second embodiment of the present invention. A more detailed configuration of the converter 220, which is the first power converting unit, in the configuration of the power converting apparatus for motor driving shown in FIG. 1 is explained below. Among components shown in FIG. 11, components same as those shown in FIG. 11 are already explained. Therefore, components related to the second embodiment are mainly explained.

As shown in FIG. 11, the modulation ratio PMF and the inverter output frequency FINV generated by the second control unit 100, the capacitor voltage EFC detected by the voltage detector 8, and the input current IS detected by the current detector 214 are input to the first control unit 200. This first control unit 200 is a component having a function of controlling an output voltage (a DC voltage) of the converter 220 and includes a DC-voltage-command generating unit 210 and a DC-voltage control unit 280.

The DC-voltage-command generating unit 210 generates a DC voltage command EFC*, which is a target value of a capacitor voltage and is the capacitor voltage command EFC*. A voltage control unit 211 receives input of the DC voltage command EFC* and the capacitor voltage EFC, and generates, based on a deviation between the DC voltage command EFC* and the capacitor voltage EFC, a current command IS* and outputs the current command IS*. A current control unit 212 receives input of the current command IS* and the input current IS detected by the current detector 214 and generates, based on a deviation between the current command IS* and the input current IS, a converter voltage command VC*. A PWM-signal generating unit 213 receives input of the converter voltage command VC* and generates an ON OFF signal (a PWM signal) CG to the switching element (not shown) of the converter 220 for causing a voltage on an input side (an AC power supply side) of the converter 220 to coincide with the converter voltage command VC*.

With the functions of the voltage control unit 211, the current control unit 212, and the PWM-signal generating unit 213 configured as explained above, the DC-voltage control unit 280 generates the PWM signal CG using the DC voltage command EFC*, the capacitor voltage EFC, and the input current IS and outputs the PWM signal CG to the converter 220.

Figure 12:
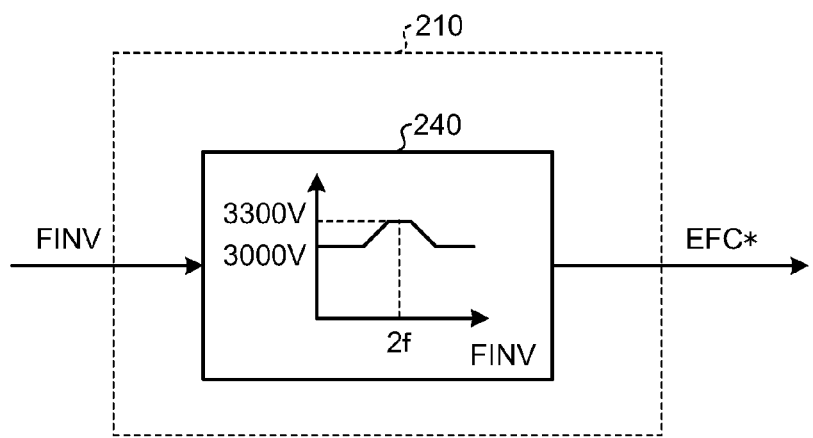
FIG. 12 is a diagram of a first configuration example of a DC-voltage-command generating unit in the second embodiment shown in FIG. 11.

A detailed configuration and operation of the DC-voltage-command generating unit 210 are explained below with reference to FIG. 12. FIG. 12 is a diagram of a first configuration example of the DC-voltage-command generating unit 210 in the second embodiment shown in FIG. 11.

As shown in FIG. 12, the DC-voltage-command generating unit 210, which is the first configuration example, includes a DC voltage command table 240. The DC voltage command table 240 generates, based on the inverter output frequency FINV, the DC voltage command EFC* and outputs the DC voltage command EFC*.

When the inverter output frequency FINV is not near the frequency of the power supply 2f component, the DC voltage command table 240 outputs a voltage during the normal time as the DC voltage command EFC*. On the other hand, when the inverter output frequency FINV is near the frequency of the power supply 2f component, the DC voltage command table 240 outputs a voltage command higher than the voltage during the normal time as the DC voltage command EFC*.

For example, when an AC power supply frequency is 60 hertz, if the inverter output frequency FINV is not in a range of about 90 hertz to 150 hertz centering around 120 hertz, which is the frequency of the power supply 2f component, the DC voltage command table 240 outputs, for example, 3000 volts as the DC voltage command EFC*. If the inverter output frequency FINV is in a range of about 90 hertz to 150 hertz, the DC voltage command table 240 outputs, for example, 3300 volts, which is obtained by increasing the voltage during the normal time by about 5% to 10%, as the DC voltage command EFC*.

By configuring the DC-voltage-command generating unit 210 in this way, when the inverter output frequency FINV is in a domain near the frequency of the power supply 2f component, for example, a domain of 90 hertz to 150 hertz, it is possible to control the capacitor voltage EFC to be high and, therefore, increase a maximum voltage that can be output by the inverter 2. According to this control, it is possible to reduce a necessary weakening magnetic flux amount. As a result, it is possible to also reduce the current command adjustment amount dV and reduce the magnitude of the d-axis current command id*. Therefore, it is possible to reduce the electric current of the motor 6 compared with an electric current output when the configuration of the first control unit 200 according to the second embodiment is not applied.

Figure 13:
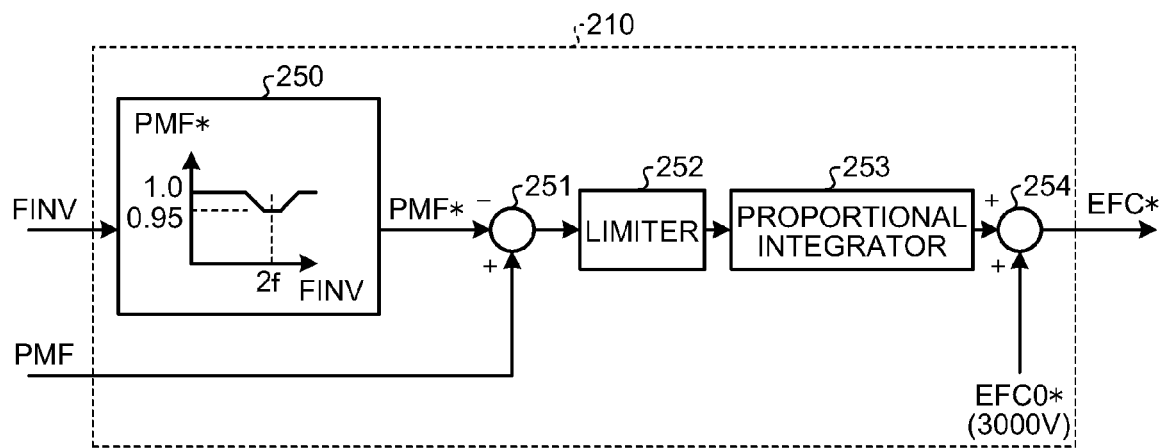
FIG. 13 is a diagram of a second configuration example of the DC-voltage-command generating unit in the second embodiment shown in FIG. 11.

The DC-voltage-command generating unit 210 is not limited to the configuration shown in FIG. 12 and can be configured, for example, as shown in FIG. 13. FIG. 13 is a diagram of a second configuration example of the DC-voltage-command generating unit 210 in the second embodiment shown in FIG. 11.

The DC-voltage-command generating unit 210 shown in FIG. 13 is a component that generates, based on the inverter output frequency FINV and the modulation ratio command PMF* as a target value of the modulation ratio (the voltage amplitude index) PMF, the DC voltage command EFC* and includes a modulation ratio command table 250, a subtracter 251, a limiter 252, a proportional integrator 253, and an adder 254.

The modulation ratio command table 250 generates, based on the input inverter output frequency FINV, the modulation ratio command PMF*. The subtracter 251 receives input of the modulation ration PMF and the modulation ratio command PMF*, generates a deviation signal obtained by subtracting the modulation ratio command PMF* from the modulation ratio PMF, and outputs the deviation signal to the limiter 252. When a sign of the input signal is plus, the limiter 252 directly outputs the input signal. When the sign of the input signal is minus, the limiter 252 outputs zero irrespective of a value of the input signal. The proportional integrator 253 outputs a value obtained by subjecting the output of the limiter 252 to proportional integral calculation. The adder 254 adds up the output of the proportional integrator 253 and the basic DC voltage command EFC0* (e.g., 3000 volts) and outputs the added-up signal as the DC voltage command EFC*.

For example, when the AC power supply frequency is 60 hertz, if the inverter output frequency FINV is not in a range of about 90 hertz to 150 hertz centering around 120 Hz, which is the frequency of the power supply 2f component, the modulation ratio command table 250 outputs, for example, 1.0 as the modulation ratio command PMF*. On the other hand, if the inverter output frequency FINV is in the range of about 90 hertz to 150 hertz, the modulation ratio command table 250 outputs, for example, 0.95 as the modulation ratio command PMF*.

By configuring the DC-voltage-command generating unit 210 in this way, when the inverter output frequency FINV is in, for example, the domain of 90 hertz to 150 hertz, it is possible to increase the capacitor voltage EFC such that the modulation ratio PMF of the inverter 2 is, for example, 0.95. Therefore, it is possible to increase the maximum voltage that the inverter 2 can output. According to this control, it is possible to reduce a necessary weakening magnetic flux amount. As a result, it is possible to also reduce the current command adjustment amount dV and reduce the magnitude of the d-axis current command id*. Therefore, it is possible to reduce the electric current of the motor 6 compared with an electric current output when the configuration of the first control unit 200 according to the second embodiment is not applied.

With the configuration of the first embodiment explained above, it is possible to reduce the modulation ratio PMF to, for example, 0.95 by, while maintaining the output torque of the motor 6 at a predetermined command value, dropping the induced voltage of the motor 6 and dropping the output voltage of the inverter 2 in a domain where the inverter output frequency FINV is near the frequency of the power supply 2f component. Therefore, because the pulse mode is switched to the synchronous three-pulse mode, which is the synchronous pulse mode, it is possible to adjust the pulse width of a voltage output by the inverter 2 according to the pulsation suppression signal BTPMFCMP, which is an output of the pulsation-suppression-signal calculating unit 71, and perform the control for cancelling the power supply 2f component. Consequently, the problem in that the AC motor generates an over current and excessively large torque pulsation occurs is solved.

With the configuration of the first embodiment, the current commands (the d-axis current command id* and the q-axis current command iq*) with which the modulation ratio PMF coincides with the modulation ratio command PMF* are generated. Therefore, it is possible to reduce the modulation ratio PMF to, for example, 0.95 by, while maintaining the output torque of the motor 6 at a predetermined value, dropping the induced voltage of the motor 6 and dropping the output voltage of the inverter 2.

With the configuration of the first embodiment, because the synchronous three-pulse mode, which is the synchronous pulse mode, is selected as the pulse mode, the numbers of pulses and the positions of the pulses respectively included in the positive half period and the negative half period of the inverter 2 are equal and the positive and negative symmetry of the voltage applied to the motor 6 is secured. Therefore, it is possible to prevent current oscillation and torque pulsation from occurring in the motor 6, prevent occurrence of noise and oscillation due to the current oscillation and torque pulsation, and perform stable driving of the motor 6.

Further, with the configuration of the second embodiment, the effect of reducing the electric current of the motor 6 is large compared with the configuration of the first embodiment to which the second embodiment is not applied. Because the electric current of the motor 6 can be further reduced, it is possible to further reduce losses of the inverter 2 and the motor 6.

In the explanation in the embodiments, the power converting apparatus for motor driving that controls the permanent magnet synchronous motor is the target of the explanation. However, the control method explained above can be applied to power converting apparatuses for motor driving that control to drive motors of other types.

The configurations explained in the embodiments are examples of contents of the present invention. It goes without saying that the configurations can be combined with other publicly-known technologies and can be changed by, for example, omitting a part without departing from the spirit of the present invention.

Further, in this specification, the application to the power converting apparatus for motor driving for an electric motor vehicle is mainly explained. However, an application field is not limited to this. It goes without saying that application to other industrial fields is also possible.

INDUSTRIAL APPLICABILITY

As explained above, the power converting apparatus for motor driving according to the present invention is useful as an invention that enables the cancellation control for the power supply 2f component while suppressing occurrence of an over current and excessively large torque pulsation in the AC motor.

The invention claimed is:

1. A power converting apparatus for motor driving comprising:
a first power converting unit that is connected to an AC power supply and converts an AC voltage from the AC power supply into a DC voltage;
a second power converting unit that is connected to the first power converting unit and converts the DC voltage into the AC voltage and outputs the AC voltage to an AC motor;
a first control unit that controls the first power converting unit; and
a second control unit that controls the second power converting unit, wherein
the second control unit includes:
a current-command generating unit that generates, based on at least a torque command, a current command for the AC motor;
a voltage-amplitude-index calculating unit that calculates, based on the current command, a voltage amplitude index that should be applied to the AC motor;
a current-command adjusting unit that generates, based on at least the voltage amplitude index and a frequency of the AC motor, a current command adjustment amount for adjusting the current command; and
a pulsation-suppression-signal generating unit that generates, based on the DC voltage, a pulsation suppression signal, and
the second control unit generates, based on a control signal including the current command adjusted by the current command adjustment amount and the pulsation suppression signal, a PWM signal to the second power converting unit and outputs the PWM signal.

2. The power converting apparatus for motor driving according to claim 1, wherein the second control unit controls, when the frequency of the AC motor is present in a predetermined range, a voltage output by the second power converting unit to a predetermined value smaller than a maximum voltage that can be output according to the DC voltage.

3. The power converting apparatus for motor driving according to claim 2, wherein the second control unit selects, when control for causing torque output by the AC motor to coincide with the torque command is performed by the current-command generating unit and the current-command adjusting unit, a current command on a torque fixed line based on the torque command and on an inner side of a voltage limit line.

4. The power converting apparatus for motor driving according to claim 2, wherein the predetermined range is a range centering around a frequency twice as high as a frequency of the AC power supply.

5. The power converting apparatus for motor driving according to claim 2, wherein the predetermined value is a value equal to or larger than 90% and smaller than 100% of a maximum voltage that can be output under the DC voltage by an output voltage of the second power converting unit.

6. The power converting apparatus for motor driving according to claim 1, wherein the current-command adjusting unit includes a voltage-amplitude-target-command generating unit that generates, based on the frequency of the AC motor, a voltage amplitude target command indicating a maximum value of the voltage amplitude index.

7. The power converting apparatus for motor driving according to claim 6, wherein the current-command adjusting unit generates, based on a deviation between the voltage amplitude target command and the voltage amplitude index, the current command adjustment amount.

8. The power converting apparatus for motor driving according to claim 6, wherein the voltage-amplitude-target-command generating unit generates, when the frequency of the AC motor is present in a predetermined range, the voltage amplitude target command for setting an output voltage of the second power converting unit to a predetermined value smaller than a maximum voltage that can be output according to the DC voltage.

9. The power converting apparatus for motor driving according to claim 1, wherein
the current-command generating unit generates a first d-axis current command, which is a magnetic flux component current of the AC motor, from the torque command, adjusts the first d-axis current command according to the current command adjustment amount to generate a second d-axis current command, and generates, based on the torque command and the second d-axis current command, a first q-axis current command, which is a torque component current, and
the voltage-amplitude-index calculating unit calculates, based on the second d-axis current command and the first q-axis current command, the voltage amplitude index.

10. The power converting apparatus for motor driving according to claim 1, wherein
the second control unit includes:
a pulse-mode switching unit that switches a pulse mode of the second power converting unit; and
a pulse-mode selecting unit that selects, according to control by the pulse-mode switching unit, at least one of a plurality of pulse modes including an asynchronous pulse mode for generating the PWM signal asynchronously with the frequency of the AC motor and a synchronous pulse mode for generating the PWM signal in synchronization with the frequency of the AC motor, and
the second control unit selects, when the frequency of the AC motor is present in a predetermined range centering around a frequency twice as high as a frequency of the AC power supply, the synchronous pulse mode as the pulse mode.

11. The power converting apparatus for motor driving according to claim 10, wherein the pulse-mode selecting unit selects, based on at least the voltage amplitude index not including the pulsation suppression signal, the pulse mode.

12. The power converting apparatus for motor driving according to claim 1, wherein
the second control unit includes:
a pulse-mode switching unit that switches a pulse mode of the second power converting unit; and
a pulse-mode selecting unit that selects, according to control by the pulse-mode switching unit, at least one of a plurality of pulse modes including an asynchronous pulse mode for generating the PWM signal asynchronously with the frequency of the AC motor and a synchronous three-pulse mode for generating the PWM signal, a number of pulses of which in a voltage half period is three, generated in synchronization with the frequency of the AC motor, and
the second control unit selects, when the frequency of the AC motor is present in a predetermined range centering around a frequency twice as high as a frequency of the AC power supply, the synchronous three-pulse mode as the pulse mode.

13. The power converting apparatus for motor driving according to claim 12, wherein the pulse-mode selecting unit selects, based on at least the voltage amplitude index not including the pulsation suppression signal, the pulse mode.

14. A power converting apparatus for motor driving comprising:
a first power converting unit that is connected to an AC power supply and converts an AC voltage from the AC power supply into a DC voltage;
a second power converting unit that is connected to the first power converting unit and converts the DC voltage into the AC voltage and outputs the AC voltage to an AC motor;
a first control unit that controls the first power converting unit; and
a second control unit that controls the second power converting unit, wherein
the second control unit includes:
a current-command generating unit that generates, based on at least a torque command, a current command for the AC motor; and
a voltage-amplitude-index calculating unit that calculates, based on the current command, a voltage amplitude index that should be applied to the AC motor, and
the first control unit includes:
a DC-voltage-command generating unit that generates a DC voltage command, which is a target value of the DC voltage; and
a voltage control unit that generates a control signal such that the DC voltage and the DC voltage command to coincide with each other, and
the DC voltage command generated when the frequency of the AC motor is present in a predetermined range is generated to be larger than the DC voltage command generated when the frequency of the AC motor is not present in the predetermined range.

15. The power converting apparatus for motor driving according to claim 14, wherein the DC-voltage-command generating unit generates, based on the frequency of the AC motor, the DC voltage command.

16. The power converting apparatus for motor driving according to claim 14, wherein the DC-voltage-command generating unit generates, based on the voltage amplitude index, the DC voltage command.

17. The power converting apparatus for motor driving according to claim 14, wherein the DC-voltage-command generating unit generates, based on the frequency of the AC motor and the voltage amplitude index, the DC voltage command.

18. The power converting apparatus for motor driving according to claim 14, wherein the DC-voltage-command generating unit generates, based on the frequency of the AC motor, a target value indicating a maximum of the voltage amplitude index and generates, based on the target value indicating the maximum of the voltage amplitude index and the voltage amplitude index, the DC voltage command.

19. The power converting apparatus for motor driving according to claim 14, wherein the predetermined range is a range centering around a frequency twice as high as a frequency of the AC power supply.

20. The power converting apparatus for motor driving according to claim 14, wherein the predetermined value is a value equal to or larger than 90% and smaller than 100% of a maximum voltage that can be output under the DC voltage by an output voltage of the second power converting unit.

* * * * *